(12) United States Patent
Ikeno

(10) Patent No.: US 7,812,990 B2
(45) Date of Patent: Oct. 12, 2010

(54) DATA PROCESSING APPARATUS AND METHOD

(75) Inventor: Hideo Ikeno, Kanagawa (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/371,826

(22) Filed: Feb. 16, 2009

(65) Prior Publication Data

US 2009/0201552 A1    Aug. 13, 2009

Related U.S. Application Data

(63) Continuation of application No. 10/393,618, filed on Mar. 21, 2003, now Pat. No. 7,511,843.

(30) Foreign Application Priority Data

Mar. 29, 2002    (JP) .............................. 2002-096178

(51) Int. Cl.
 *G06F 15/00* (2006.01)
 *B41J 1/00* (2006.01)
(52) U.S. Cl. ...................................... 358/1.15; 358/1.9
(58) Field of Classification Search ................. 358/1.6, 358/1.9, 1.15, 1.16; 399/81, 82; 707/3, 4; 715/825; 710/15, 16
See application file for complete search history.

(56) References Cited

U.S. PATENT DOCUMENTS

| | | | |
|---|---|---|---|
| 5,469,533 A | 11/1995 | Dennis | |
| 5,659,795 A | 8/1997 | Duvall et al. | |
| 6,088,120 A * | 7/2000 | Shibusawa et al. | 358/1.15 |
| 6,493,101 B1 | 12/2002 | Okazawa | |
| 6,493,712 B1 * | 12/2002 | Karp et al. | 358/1.11 |
| 6,621,589 B1 | 9/2003 | Al-Kazily et al. | |
| 6,879,408 B1 * | 4/2005 | Hori et al. | 358/1.13 |
| 6,940,614 B2 * | 9/2005 | Subramaniam | 358/1.13 |
| 7,159,190 B2 | 1/2007 | Perry | |
| 7,480,745 B2 * | 1/2009 | Dahneke et al. | 710/15 |
| 2001/0006423 A1 * | 7/2001 | Subramaniam | 358/1.1 |
| 2001/0055420 A1 | 12/2001 | Nagatani | |
| 2003/0063305 A1 * | 4/2003 | McIntyre | 358/1.13 |
| 2004/0046797 A1 | 3/2004 | Perry | |
| 2004/0070790 A1 | 4/2004 | Hara | |
| 2005/0231756 A1 * | 10/2005 | Maeshima | 358/1.15 |
| 2005/0257275 A1 | 11/2005 | Ooba | |
| 2006/0206629 A1 * | 9/2006 | Sasaki et al. | 710/8 |
| 2006/0256367 A1 * | 11/2006 | Wei | 358/1.15 |
| 2007/0043805 A1 * | 2/2007 | Izaki et al. | 709/201 |
| 2007/0046974 A1 * | 3/2007 | Machida | 358/1.14 |
| 2007/0245039 A1 * | 10/2007 | Dahneke et al. | 710/15 |
| 2008/0085133 A1 * | 4/2008 | Ishii | 399/83 |
| 2008/0180722 A1 * | 7/2008 | Miyachi et al. | 358/1.15 |

* cited by examiner

*Primary Examiner*—Kimberly A Williams
(74) *Attorney, Agent, or Firm*—Rossi, Kimms & McDowell LLP

(57) ABSTRACT

Provided are a data processing apparatus and method that make it possible to detect improper resource data that has been stored in a printer. The data processing apparatus, which is connectable to an image forming apparatus that refers to resource data when an image is formed, first acquires information relating to resource data that has been stored in the image forming apparatus and stores the information on a hard disk. Next, improper resource data is detected by control exercised by a CPU in the processing apparatus based upon the acquired information relating to the resource data. After prescribed processing is executed with respect to improper resource data that has been detected, information relating to prescribed resource data is provided to the image forming apparatus via a network controller.

5 Claims, 18 Drawing Sheets

FIG. 5

| BASIC I/O PROGRAM | ~1801 |
| VARIOUS PROCESSING PROGRAMS | ~1803 |

| BASIC I/O PROGRAM |—1801 |
|---|---|
| SYSTEM PROGRAM | —1802 |
| VARIOUS PROCESSING PROGRAMS | —1803 |
| RELATED DATA | —1804 |
| WORK AREA | —1805 |

DATA PROCESSING APPARATUS AND METHOD

RELATED APPLICATION INFORMATION

This application is a continuation of co-pending U.S. application Ser. No. 10/393,618 filed Mar. 21, 2003, which is incorporated herein by reference.

FIELD OF THE INVENTION

This invention relates to a data processing apparatus and method for supplying resource data appropriately to a printing apparatus that refers to resource data when printing is performed.

BACKGROUND OF THE INVENTION

Multiple items of resource data for image formation processing or color processing, namely resource data such as profiles, look-up tables, dither patterns, fonts and forms, etc., referred to by a printer (image forming apparatus) at the time of printing usually are retained in the particular printer. When printing is performed, the user employs a printer driver to specify the resource data used. Alternatively, predetermined resource data in a printer is referred to at the time of printing.

Resource data referred to at the time of printing includes data stored in a printer at the time of shipping (when the printer is in the initial state) and data stored in the printer later as by downloading using a download program or the like. An example of a downloader program for downloading resource data is a special processing program for being manipulated by specialists in each category of resource data to create the essential part of resource data (referred to below as "resource data per se"), and for downloading the resource data per se. Another example is a processing program that executes only download processing upon accepting resource data per se created by specialists in each of resource data categories.

When image formation processing or color processing is executed in regard to this resource data within each printer, the structure of the resource data per se is interpreted. On the other hand, it is difficult to interpret the content of the resource data per se with a processing unit that performs batch management of various resource data within a printer or with a program that manages and downloads various resource data in one batch from the outside. Therefore, in order to express the features of resource data per se within a printer, the resource data is provided with a resource-data attribute information portion (referred to as "resource data attributes" below) specific to each printer.

In download processing, processing for storing resource data per se in a printer and processing for setting the printer-specific resource data attributes is required. Accordingly, resource data attributes for expressing resource data per se in a printer include an item for reflecting the resource data per se accurately. The resource data attributes must be set reliably based upon the intention of experts who have thorough knowledge of the resource data and who created the resource data per se.

However, in a printer that executes print processing upon referring to resource data, there are cases where correct print processing cannot be carried out owing to errors in the resource data information (a mismatch between attributes and resource data per se) or erroneous designations by the user based upon such errors.

Further, resource data attributes cannot be set at will by the operator of a downloader that executes only download processing upon receiving resource data per se created by experts in various categories of resource data. Furthermore, resource data attributes cannot be set at will without interpreting resource data per se by a resource data management unit within a printer.

Further, with the downloader mentioned above, usually information relating to each item of resource data is provided by the creator of the resource data, the resource data information is set automatically or by manual input and then downloading is performed. However, owing to suspension of downloading ascribable to communication error, or as a result of settings omissions by the operator, resource data in which resource data attributes planned to be set have been left unset (such resource data shall be referred to as "improper resource data" below) will exist within the printer.

Further, since suitable initial values of resource data attributes within a printer will have been set from among effective attribute values at the time of generation, whether these attribute values were set by the download operation or set as the initial values of the printer cannot be determined. As a consequence, whether or not resource data was downloaded reliably by the downloader cannot be determined.

Furthermore, there are cases where improper resource data that has been stored in a printer is not eliminated and improper resource data is specified from a program such as a printer driver for specifying resource data, which is used at the time of printing, from a list of stored resource data.

SUMMARY OF THE INVENTION

Accordingly, the present invention has been proposed to solve the problems of the prior art and its object is to provide a data processing apparatus and method that make it possible to detect improper resource data that has been stored in a printer.

According to the present invention, the foregoing object is attained by providing a data processing apparatus connectable to an image forming apparatus that refers to resource data when an image is formed, comprising: information acquisition means for acquiring attribute information relating to resource data that has been stored in the image forming apparatus; detecting means for detecting improper resource data based upon the acquired attribute information relating to the resource data; and providing means for providing the image forming apparatus with attribute information relating to prescribed resource data.

Further, the data processing apparatus according to the invention further comprises list display means for displaying a list of resource data, wherein the list display means foregoes displaying the detected improper resource data in the list.

Further, the data processing apparatus according to the invention further comprises attribute information display means for displaying attribute information relating to the resource data acquired by the information acquisition means.

By virtue of the structure described above, it is possible to provide download means for downloading resource data that excludes improper resource data, namely resource data that is invalid or that may possibly cause a problem if used.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 5 is a diagram illustrating the structure of a memory map for when a processing program, which is executed in a data processing apparatus according to a first embodiment, has been loaded in a RAM;

DETAILED DESCRIPTION OF THE PREFERRED EMBODIMENTS

Preferred embodiments of the present invention will now be described in detail in accordance with the accompanying drawings.

First Embodiment

Figure 1:
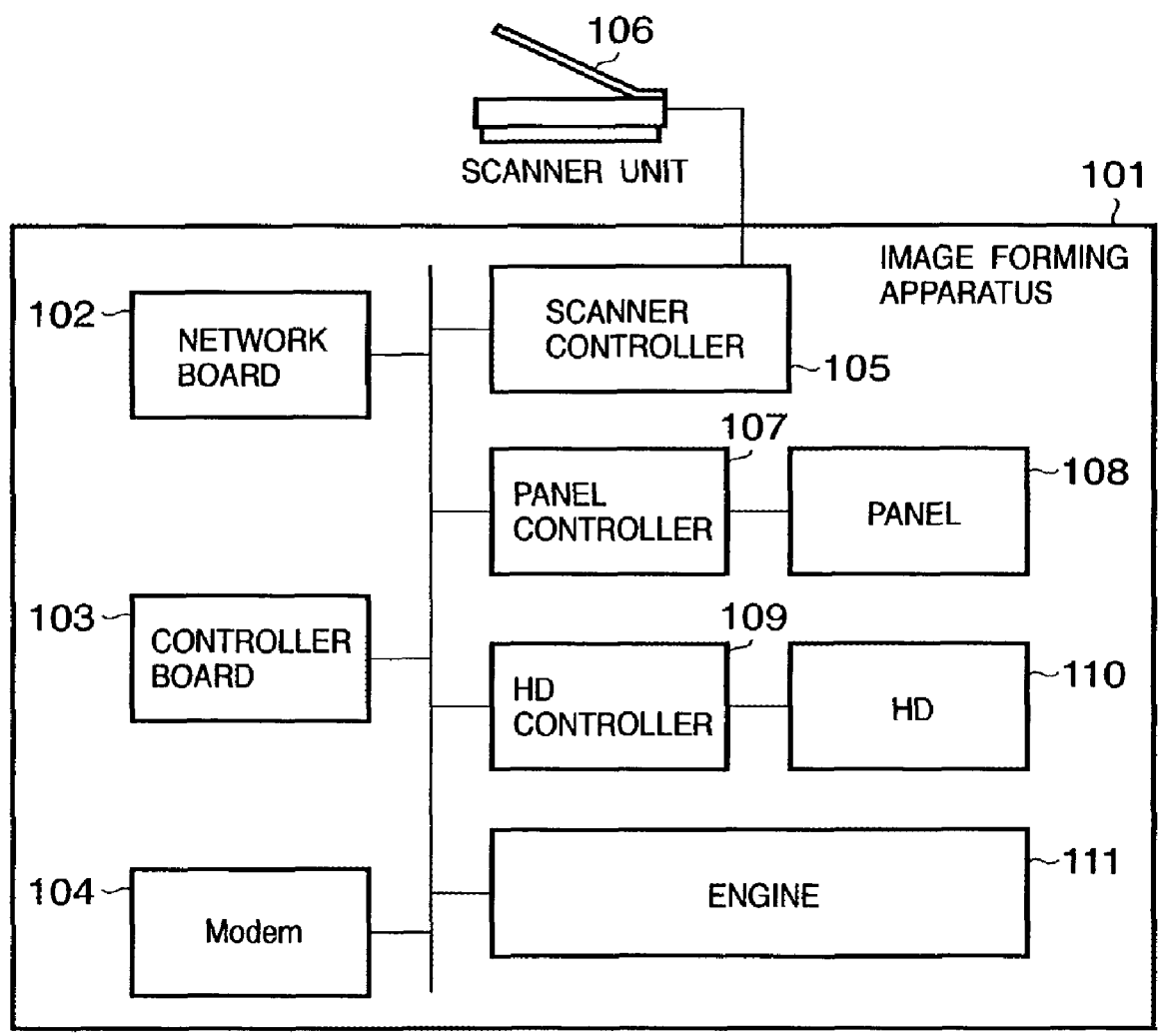
FIG. 1 is a block diagram illustrating an example of the hardware modules of a multifunction copier implemented using an image forming apparatus according to an embodiment of the present invention.

FIG. 1 is a block diagram illustrating an example of the hardware modules of a multifunction copier implemented using an image forming apparatus 101 according to an embodiment of the present invention.

The image forming apparatus 101 is for implementing the printing function of a printer that refers to resource data when an image is formed. The image forming apparatus 101 can function also as a stand-alone printer. Further, the image forming apparatus 101 can also be connected to another personal computer on a network and therefore can function also as a network printer rather than a local printer.

As shown in FIG. 1, the image forming apparatus 101 comprises a network board 102, a controller board 103, a modem 104, a scanner controller 105, a panel controller 107, a panel 108, a hard disk (HD) controller 109, a hard disk (HD) 110 and an engine 111. These components are interconnected electrically. A scanner unit 106 is connected to the scanner controller 105, whereby the apparatus is capable of functioning as a copier.

The network board 102 remotely connects the image forming apparatus 101 to a data transmitting unit or control unit of a personal computer or the like via a network line that utilizes a protocol such as TCP/IP. Further, the controller board 103 locally connects the image forming apparatus 101 to a data transmitting unit or control unit of a personal computer or the like via an SCSI or USB.

Data that has been received from the modem 104, scanner controller 105 and panel controller 107 is interpreted by the network board 102 and controller board 103. The network board 102 and controller board 103 form an image in cooperation with the HD controller 109 and deliver the image to the engine 111.

The modem 104 remotely connects the image forming apparatus 101 to a data transmitting unit or control unit of a personal computer or the like via a telephone line. Further, the panel controller 107 provides a user interface as part of the image forming apparatus 101 and controls the panel 108, which accepts commands from a user.

The hard-disk controller 109 controls the hard disk 110, which is an area for storing resource data within the image forming apparatus 101. The hard disk 110 is a storage location that stores various data inclusive of the resource data. The engine 111 receives an image, which has been formed by the controller board 103, and executes print processing (image formation processing).

Figure 2:
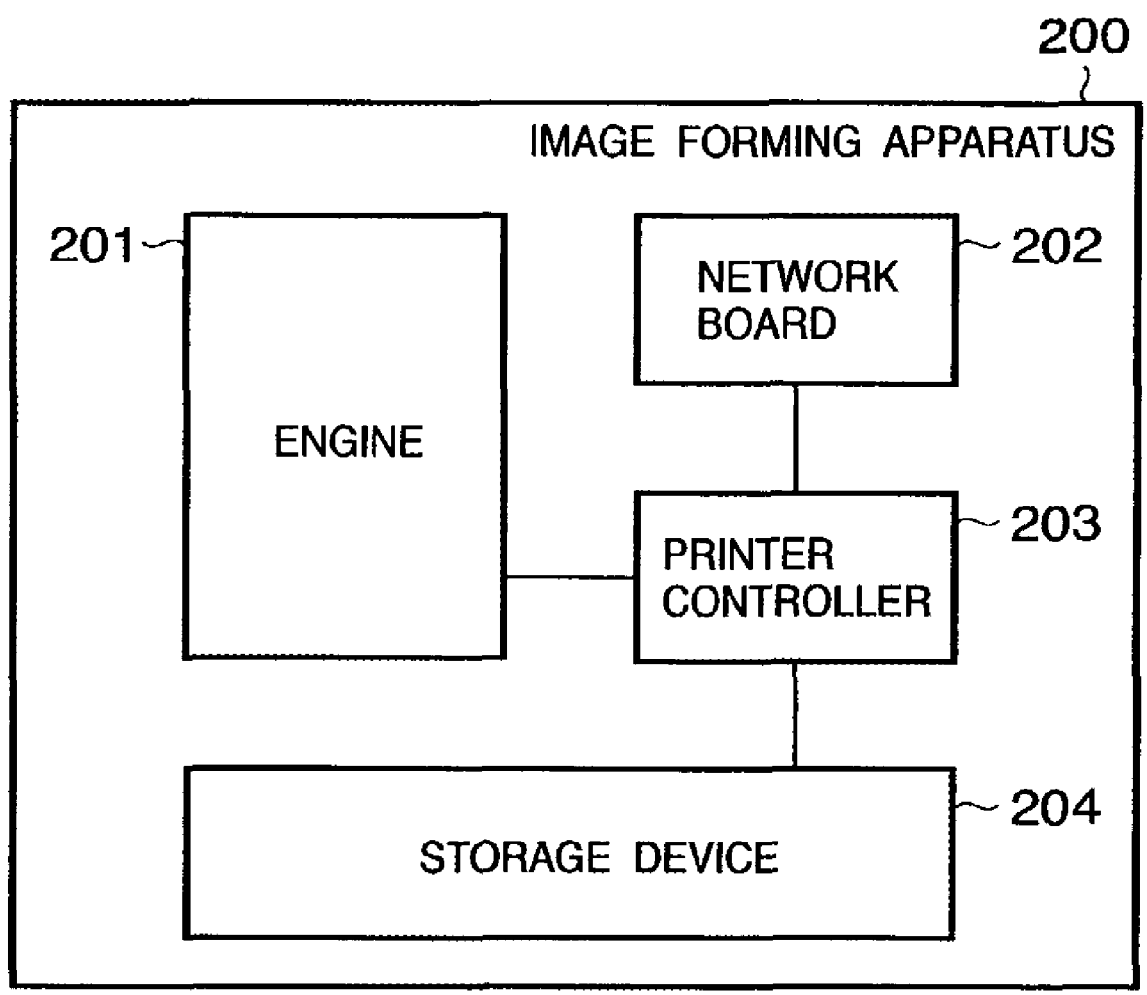
FIG. 2 is a block diagram illustrating an example of the hardware modules of a multifunction copier implemented using another image forming apparatus according to an embodiment of the present invention.

FIG. 2 is a block diagram illustrating an example of the hardware modules of a multifunction copier implemented using another image forming apparatus 200 according to an embodiment of the present invention.

As shown in FIG. 2, the image forming apparatus 200 comprises an engine 201, a network board 202, a printer controller 203 and a storage device 204.

As illustrated in FIG. 2, the network board 202 remotely connects the image forming apparatus 200 to a data transmitting unit or control unit of a personal computer or the like via a network line that utilizes a protocol such as TCP/IP. Further, the printer controller 203 locally connects the image forming apparatus 200 to a data transmitting unit or control unit of a personal computer or the like via an SCSI or USB.

The network board 202 and printer controller 203 interpret received data, form an image in cooperation with the storage device 204 and deliver the image to the engine 201. The storage device 204, which is a storage area for various data within the image forming apparatus 200, can be implemented by a non-volatile memory or hard disk, etc. Resource data referred to when an image is formed also is stored in the storage area 204. Further, after receiving an image that has been formed by the printer controller 203, the engine 201 executes print processing.

The resource data handled by this embodiment will be described next.

The resource data handled by this embodiment is stored on the hard disk 110 or in the storage device 204. When the controller board 103 or printer controller 203 forms an output image, the resource data is referred to as data for image formation processing and color processing in accordance with a command included in print data or scan data. The types of resource data include fonts, which are sets of characters, forms for forming an image by being superimposed on print data, profiles for expressing color space of various devices, look-up tables (LUTs), which are conversion tables for the purpose of color correction, and dither patterns, which are constituted by pattern data for deciding color expression.

Data stored as resource data is composed of the elementals of the resource data (i.e., the resource data per se) and attribute information (i.e., resource data attributes) of the resource data, the attribute information comprising name and data size, etc. Resource operations such as downloading, uploading, attribute setting and browsing can be performed from the data transmitting unit or control unit of the personal computer, etc., connected to the image forming apparatus (printer). As mentioned above, the resource data includes not only resource data stored by downloading but also resource data stored initially in the image forming apparatus. Resource data stored by being downloaded is generated by using software in a special-purpose device or personal computer.

Figure 3:
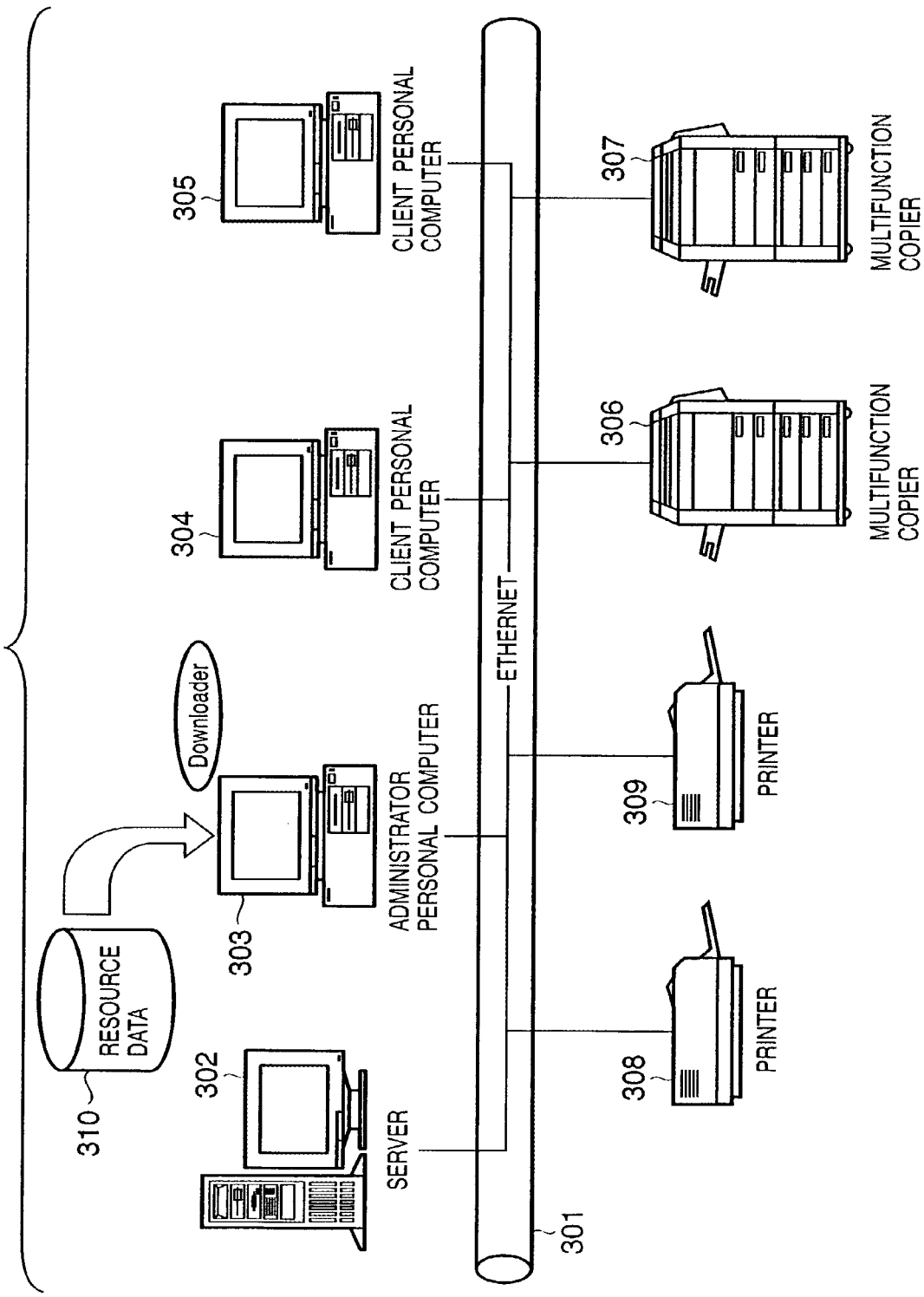
FIG. 3 is an overview useful in describing an example of the environment of use of an image forming apparatus, which refers to resource data when an image is formed, and a data processing apparatus that downloads resource data in an embodiment of the invention.

FIG. 3 is an overview useful in describing an example of the environment of use of an image forming apparatus, which refers to resource data when an image is formed, and a data processing apparatus that downloads resource data in this embodiment of the invention.

An administrator personal computer 303 shown in FIG. 3 functions as the data processing apparatus according to the present invention. By way of example, the environment of use shown in FIG. 3 is a printing system for use in an office. In this system, a server 302, the administrator personal computer 303, client personal computers 304, 305, printers 308, 309 having the structure shown in FIG. 2, and multifunction copiers 306, 307 having the structure shown in FIG. 1 are interconnected by an Ethernet (registered trademark) 301.

An example of ordinary business using this working environment is one in which print data is transmitted from the client personal computers 304, 305 to the printers 308, 309 or multifunction copiers 306, 307 via printer drivers, whereby a printout is obtained. Another example is one in which an image from the scanner unit 106 of the multifunction copiers 306, 307 is read in from the client personal computers 304, 305 via a scanner driver. It should be noted that in a case where the administrator personal computer 303 is used, this computer also can perform the above-mentioned print-data output and read operations as a client personal computer.

According to this embodiment, when the above-described resource data is downloaded to the printers 308, 309 or multifunction copiers 306, 307, this is carried out using a downloader that operates at the administrator personal computer 303. The downloader downloads resource data 310, which has been acquired from a portable storage medium or, via Ethernet 301, from the server 302 or other connected device (not shown), to the printers 308, 309 or multifunction copiers 306, 307 while setting various information.

In a case where bi-directional communication is possible between the administrator personal computer and the printers 308, 309 or multifunction copiers 306, 307, resource data that has been uploaded from the printers 308, 309 or multifunction copiers 306, 307 can be downloaded to another connected device, etc. Furthermore, a printer driver of the administrator personal computer 303 or client personal computers 304, 305 also can perform bi-directional communication with the printers 308, 309 or multifunction copiers 306, 307 and can acquire information relating to resource data within the printers 308, 309 or multifunction copiers 306, 307.

Figure 4:
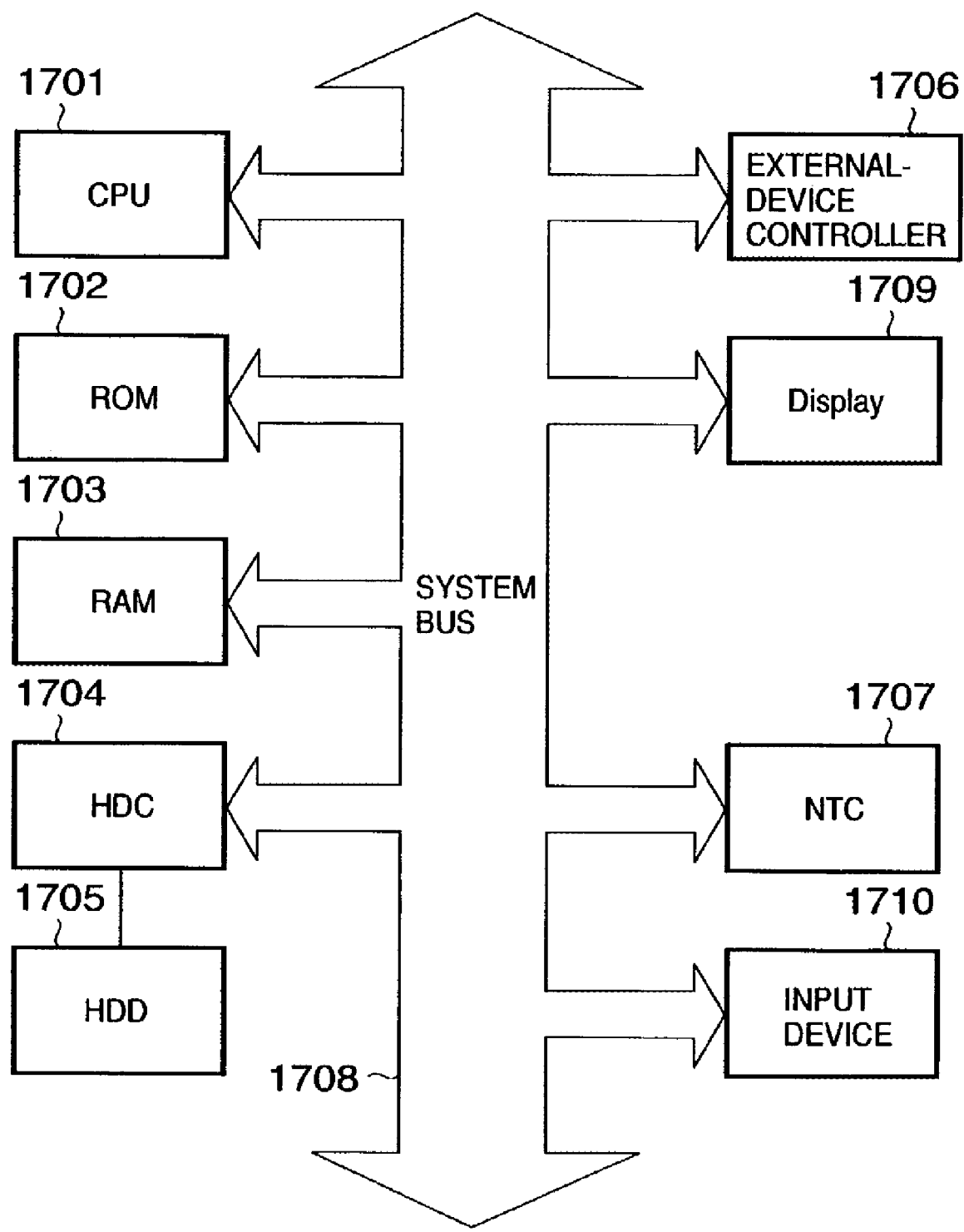
FIG. 4 is a block diagram useful in describing the components of an administrator personal computer or of client personal computers that function as a data processing apparatus according to the present invention.

FIG. 4 is a block diagram useful in describing the components of the administrator personal computer 303 or of the client personal computers 304, 305 each of which functions as a data processing apparatus according to the present invention.

As shown in FIG. 4, the data processing apparatus according to the present invention comprises a CPU 1701, a ROM 1702, a RAM 1703, a hard-disk controller (HDC) 1704, a hard-disk drive (HDD) 1705, an external-device controller 1706, a display 1709, a network controller (NTC) 1707 and an input device 1710. These components are interconnected by a system bus 1708.

The CPU 1701 is a central processing unit for controlling the overall data processing apparatus. While utilizing the RAM 1703 as a work area, the CPU 1701 executes various processing in the data processing apparatus, inclusive of resource-data download processing at the administrator personal computer 303, in accordance with a program that has been stored in the ROM 1702, hard disk 1705, a portable storage medium such as a CD set in a device connected via the external-device controller 1706, or a device connected via the network controller 1707.

The system bus 1708 is a path by which various data and control signals are exchanged among the above-described components from the CPU 1701 to the input device 1710. Character pattern data (font data), various programs and downloaded resource data have been stored in the ROM 1702 and hard disk 1705. The hard-disk controller 1704 controls the operation of the hard-disk drive that the data processing apparatus utilizes as one storage device. If second and third new hard-disk drives are added to this data processing apparatus, then the hard-disk controller 1704 will control the operation of each of these drives.

The external-device controller 1706 controls storage devices and input/output devices such as a floppy disk (FD), CD, DVD, MO, CD-R drive, scanner and printer connected to the data processing apparatus by SCSI, USB and Centronics interfaces, etc.

The network controller 1707 controls an exchange of data performed among various devices (e.g., various devices connected to Ethernet 301 in this embodiment) via the network. The display 1709 is a display unit that presents a download control screen according to this embodiment to begin with and, in addition, displays information from various programs.

The input device 1710 is an interface by which the operator of a keyboard and mouse applies commands to the data processing apparatus.

Further, programs executed by the CPU 1701, beginning with a processing program used in this embodiment, have been written in ordinary computer language. The processing program of this embodiment can be supplied to other apparatus via a storage medium such as a floppy disk, hard disk, MO and CD-ROM or via a network. Furthermore, it is possible for the program to be launched directly from the above-mentioned storage media. Moreover, the program can be launched after being installed in the apparatus.

More specifically, the present invention is a data processing apparatus (administrator personal computer) capable of being connected to an image forming apparatus (printers 308, 309, multifunction copiers 306, 307) that refer to resource data when an image is formed. The apparatus comprises information acquisition means for acquiring attribute information relating to resource data that has been stored in the image forming apparatus; detecting means for detecting improper resource data based upon the acquired attribute information relating to the resource data; and providing means for providing the image forming apparatus with attribute information relating to prescribed resource data.

Further, the data processing apparatus according to the invention further comprises list display means for displaying a list of resource data, wherein the list display means foregoes displaying the detected improper resource data in the list.

Further, the data processing apparatus according to the invention further comprises attribute information display means for displaying attribute information relating to the resource data acquired by the information acquisition means.

FIG. 5 is a diagram illustrating the structure of a memory map for when the processing program, which is executed in the data processing apparatus according to a this embodiment, has been loaded in the RAM 1703.

As illustrated in FIG. 5, the memory map is composed of an area 1801 for storing a basic I/O program for input/output relative to the data processing apparatus, an area 1802 for storing a system program that provides each processing program with an operating environment, an area 1803 for storing various processing programs beginning with the processing program according to this embodiment, an area 1804 for storing related data, and a work area 1805 utilized temporarily when various programs are run. In a case where the storage capacities of the areas utilized as the areas 1801 to 1805 in the memory map become inadequate owing to a limitation upon the capacity of RAM 1703, a separate storage medium such as the hard disk 1705 can be treated as part of the area of RAM 1703.

Figure 6:
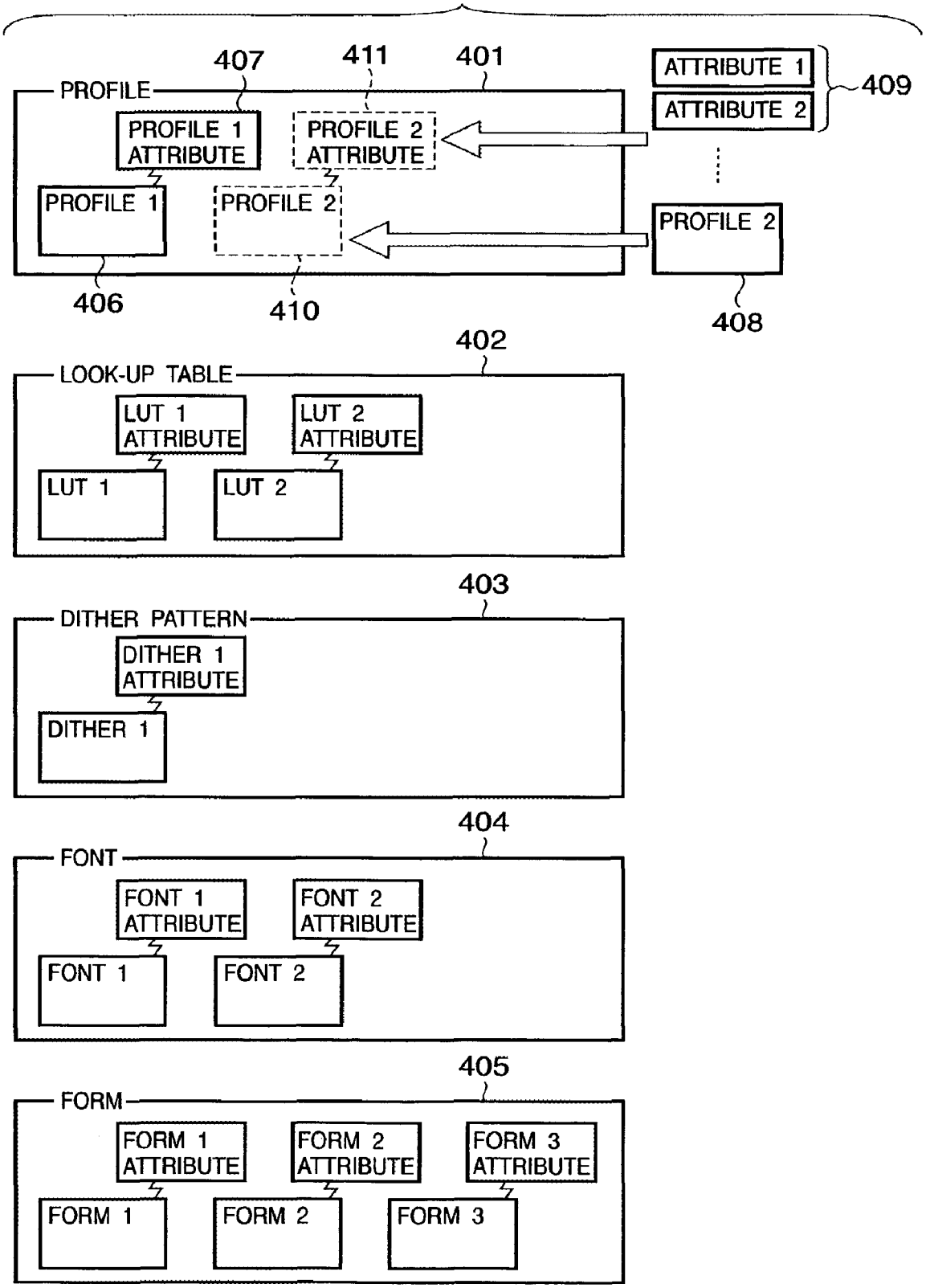
FIG. 6 is an overview useful in describing an operation for storing resource data in a storage device of a printer or on a hard disk of a multifunction copier.

FIG. 6 is an overview useful in describing an operation for storing resource data in the storage device 204 of printers 308, 309 or on the hard disk 110 of the multifunction copiers 306, 307.

As shown in FIG. 6, the hard disk 110 or storage device 204 is internally provided with an area 401 for profile resources, an area 402 for look-up tables, an area 403 for dither patterns, an area 404 for font resources and an area 405 for form resources. Resource data corresponding to these areas is stored in the appropriate areas.

Each resource is composed of resource data per se 406 and a resource data attribute 407, which is related to the attribute of the resource data per se 406, with regard to resource data "Profile 1" in area 401, as illustrated. When color processing and image formation processing is executed by a printer (image forming apparatus), usually each processing section within the printer is aware of a method of interpreting the resource data per se 406 in relation to the resource data utilized and utilizes the resource data per se 406 directly. On the other hand, the resource data attribute 407 is data comprising attribute information, which has been extracted from the resource data per se 406, and other information added on for the sake of convenience, in such a manner that the resource data can be handled even in a case where the resource data per se 406 cannot be interpreted by the resource management unit, which is for unifying the entirety of the resource data that has been stored in the data processing apparatus, and by the downloader installed in the data processing apparatus according to the present invention.

Next, operation when downloading of resource data is performed by the data processing apparatus having a downloader implemented by this embodiment will be described taking as an example resource data "Profile 2" in the area 401 for the profile resource. First, the downloader downloads (stores or generates) resource data per se 408 relating to "Profile 2" in the area 401 for the profile resource by a command provided by the data processing apparatus or by a file operation.

When new resource data (resource data per se 408) is received as resource data per se 410 by the data processing apparatus, the apparatus generates a resource data attribute 411, which is a set of attribute data related to the resource data per se 410. Each attribute value in the attribute data has been set with values that mean "undefined" (described later with reference to FIG. 8) serving as initial values. Each item of attribute data has been stored as one file on the hard disk 110 in the data processing apparatus according to this embodiment. The apparatus may be such that the attribute data is stored in memory.

Next, the downloader sets each attribute value 409 in the generated resource data attribute 411 in accordance with a command provided by the data processing apparatus.

Figure 7:
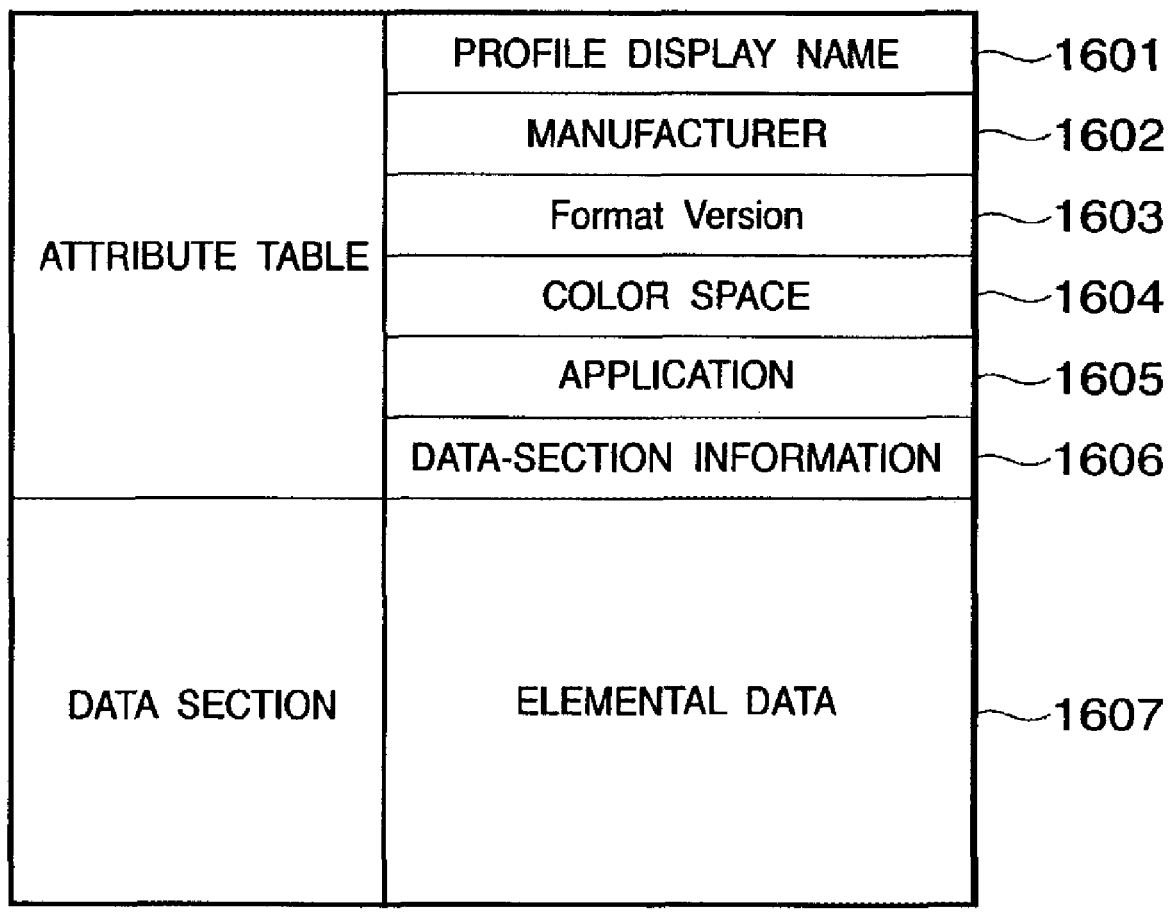
FIG. 7 is a diagram useful in describing the structure of profile resource data introduced to an administrator personal computer in the first embodiment.

FIG. 7 is a diagram useful in describing the structure of profile resource data introduced to the administrator personal computer 303 in this embodiment. The format of the profile resource has been decided by an international standards agreement. Specifically, as shown in FIG. 7, the format is constituted by elemental data 1607 that corresponds to resource data per se, and an attribute table comprising attribute data 1601 to 1696 corresponding to resource data attributes that indicate the features of the elemental data 1607. In FIG. 7, all of the attribute data is not shown in order to simplify the description. Further, the attribute data 1606 is information that is necessary in terms of handling the elemental data 1607, such as the data size of the elemental data 1607.

Attribute data 1601 regarding profile (Profile) display name is a name for specifying the profile in the attribute data. This is a name assigned by the profile creator so as to indicate the content of the profile. Attribute data 1602 regarding the manufacturer is information for specifying the manufacturer of the profile.

Attribute data 1603 regarding format version (Format Version) is information indicating the version of the profile description format. This information is used to identify the type of attribute information contained in the profile and the method of expressing the data, etc.

Attribute data 1604 regarding color space is information indicating in what color space the elemental data 1607 was created. Attribute data 1605 relating to application is information decided by the creator with regard to what this profile is to be used for (e.g., in which section in terms of color processing).

Figure 8:
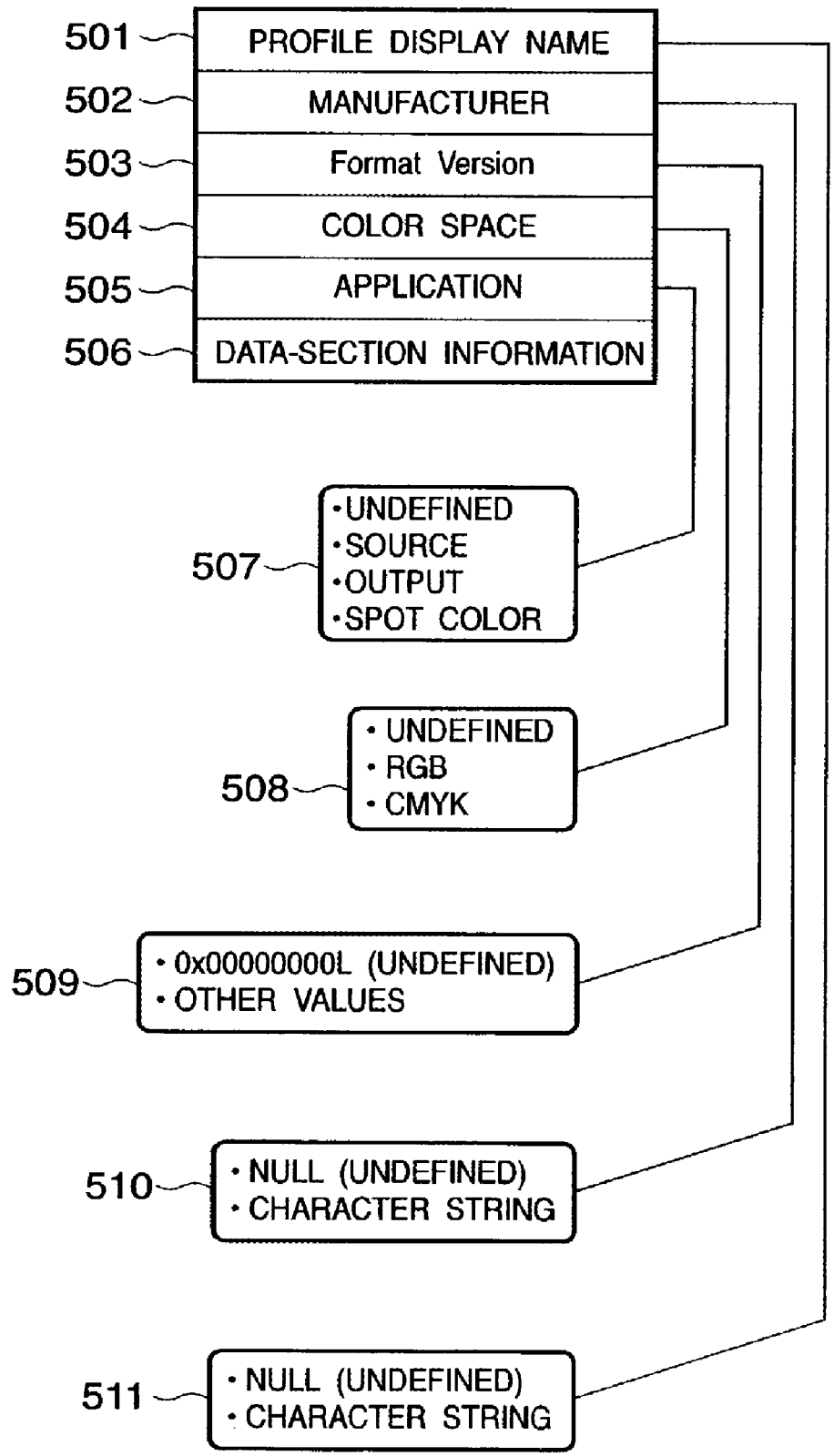
FIG. 8 is a diagram useful in describing the details of attribute data relating to profile resource data.

FIG. 8 is a diagram useful in describing the details of attribute data relating to profile resource data. As shown in FIG. 8, attribute data 501 regarding profile display name agrees with elemental data (e.g., resource data per se 406 in FIG. 6) within the data processing apparatus, i.e., attribute data 1601 regarding the profile display name of the data manufacturer shown in FIG. 7. If these items of attribute data do not agree, then operation of the data processing apparatus is not assured. Similarly, the content of resource data per se 406 in FIG. 6 must agree also with regard to attribute data 502 concerning manufacturer, attribute data 503 concerning format version, attribute data 504 concerning color space and attribute data 505 concerning application.

As shown in FIG. 8, when a value indicated at numeral 511 has been applied as the attribute data 501 concerning profile display name and resource data has been generated in the data processing apparatus, a NULL character string signifying "undefined" is set as the initial value. Further, when a value indicated at numeral 510 has been applied as the attribute data 502 regarding the manufacturer and resource data has been generated in the data processing apparatus, a NULL character string signifying "undefined" is set as the initial value.

Furthermore, when a value indicated at numeral 509 has been applied as the attribute data 503 concerning format version and resource data has been generated in the data processing apparatus, 0x00000000 signifying "undefined" is set as the initial value. Furthermore, when a value indicated at numeral 508 has been applied as the attribute data 504 concerning color space and resource data has been generated in the data processing apparatus, "undefined" is set as the initial value. Furthermore, when a value indicated at numeral 507 has been applied as the attribute data 505 concerning application and resource data has been generated in the data processing apparatus, "undefined" is set as the initial value.

It should be noted that the attribute data 506 regarding the data-section information is data that relates the resource data attribute 407 and the resource data per se 406 within the data processing apparatus. This is information capable of being set without the data processing apparatus interpreting the resource data per se 406. Further, the attribute data and the attribute values thereof shown in FIG. 8 are not all of the attribute values of the profile resource applied in relation to the present invention.

More specifically, the present invention is characterized in that the resource data is color-profile resource data that expresses the color space of an input/output device.

Figure 9:
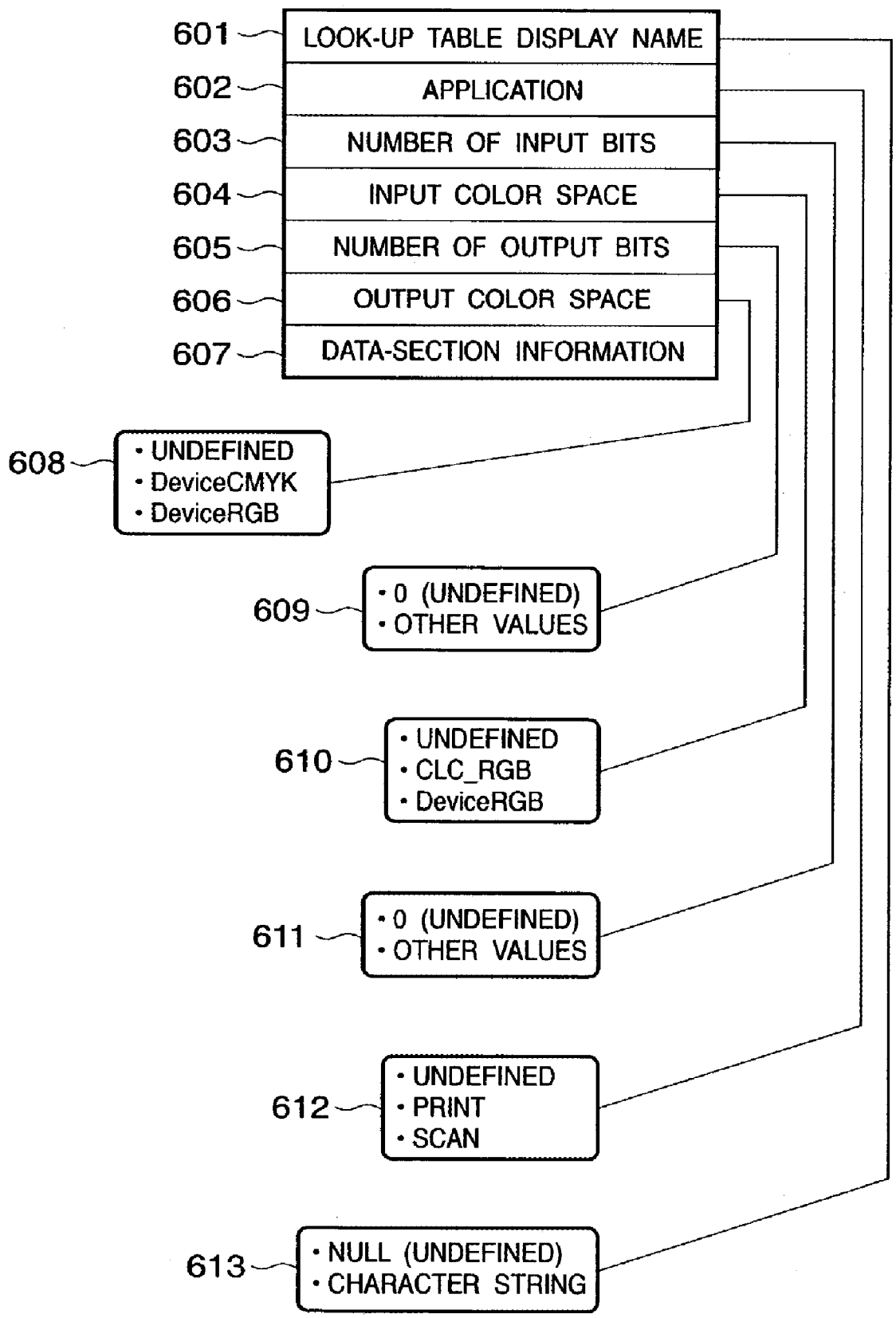
FIG. 9 is a diagram useful in describing the details of attribute data relating to look-up table resource data.

FIG. 9 is a diagram useful in describing the details of attribute data relating to look-up table resource data. Attribute data 601 regarding look-up table display name is not included in the data per se of the look-up table resource data within the data processing apparatus but is a name assigned by the creator of the look-up table so as to indicate meaning. The nature of this name is such that it is not assigned at will by an individual other than the creator.

The content of the resource data per se agrees with regard to attribute data 602 concerning application, attribute data 603 concerning number of input bits, attribute data 604 concerning input color space, attribute data 605 concerning number of output bits, and attribute data 606 regarding output color space.

When a value indicated at numeral 613 has been applied as the attribute data 601 concerning look-up table display name and resource data has been generated in the data processing apparatus, a NULL character string signifying "undefined" is set as the initial value. Further, when a value indicated at numeral 612 has been applied as the attribute data 602 regarding application and resource data has been generated in the data processing apparatus, "undefined" is set as the initial value.

Furthermore, when a value indicated at numeral 611 has been applied as the attribute data 603 regarding the number of input bits and resource data has been generated in the data processing apparatus, 0 signifying "undefined" is set as the initial value. Further, when a value indicated at numeral 610 has been applied as the attribute data 604 regarding input color space and resource data has been generated in the data processing apparatus, "undefined" is set as the initial value.

Furthermore, when a value indicated at numeral 609 has been applied as the attribute data 605 regarding the number of output bits and resource data has been generated in the data processing apparatus, 0 signifying "undefined" is set as the initial value. Further, when a value indicated at numeral 608 has been applied as the attribute data 606 regarding output color space and resource data has been generated in the data processing apparatus, "undefined" is set as the initial value.

It should be noted that the resource data attributes within the data processing apparatus and the resource data per se are related with regard to data-section information 607. This is information for making it possible to set resource data attributes without the data processing apparatus interpreting the resource data per se. Further, the attribute data and the attribute values thereof shown in FIG. 9 are not all of the attribute data of the look-up table resource.

More specifically, the present invention is characterized in that the resource data is look-up table resource data, which is a conversion table for color correction in color processing.

Figure 10:
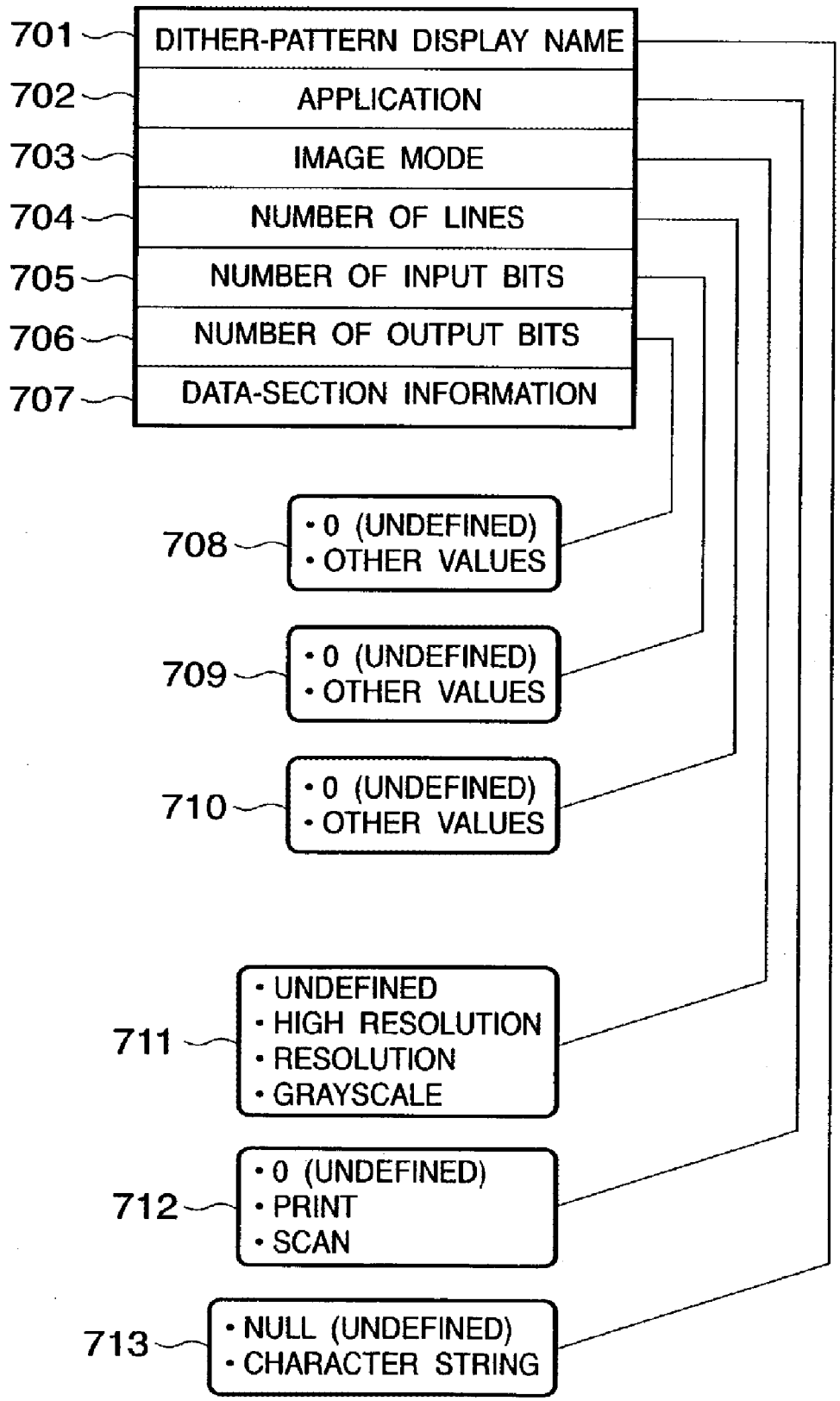
FIG. 10 is a diagram useful in describing the details of attribute data relating to dither-pattern resource data.

FIG. 10 is a diagram useful in describing the details of attribute data relating to dither-pattern resource data. As shown in FIG. 10, attribute data 701 regarding dither-pattern resource display name is not included in the data per se of the dither-pattern resource data within the data processing apparatus but is a name assigned by the creator of the dither-pattern resource data so as to indicate meaning. This name should not be one assigned at will by an individual other than the creator.

The content of the resource data per se agrees with regard to attribute data 702 concerning application, attribute data 703 concerning image mode, attribute data 704 concerning number of lines, attribute data 705 concerning number of input bits, and attribute data 706 concerning number of output bits.

When a value indicated at numeral 713 has been applied as the attribute data 701 concerning dither-pattern resource display name and resource data has been generated in the data processing apparatus, a NULL character string signifying "undefined" is set as the initial value. Further, when a value indicated at numeral 712 has been applied as the attribute data 702 regarding application and resource data has been generated in the data processing apparatus, "undefined" is set as the initial value. Furthermore, when a value indicated at numeral 711 has been applied as the attribute data 703 concerning image mode and resource data has been generated in the data processing apparatus, "undefined" is set as the initial value.

Furthermore, when a value indicated at numeral 710 has been applied as the attribute data 704 concerning number of lines and resource data has been generated in the data processing apparatus, 0 signifying "undefined" is set as the initial value. Furthermore, when a value indicated at numeral 709 has been applied as the attribute data 705 concerning number of input bits and resource data has been generated in the data processing apparatus, 0 signifying "undefined" is set as the initial value. Furthermore, when a value indicated at numeral 708 has been applied as the attribute data 706 concerning number of output bits and resource data has been generated in the data processing apparatus, 0 signifying "undefined" is set as the initial value.

It should be noted that the resource data attributes within the data processing apparatus and the resource data per se are related with regard to data-section information 707. This is information for making it possible to set resource data attributes without the data processing apparatus interpreting the resource data per se. Further, the attribute data and the attribute values thereof shown in FIG. 10 are not all of the attribute values of the dither-pattern resource data.

More specifically, the present invention is characterized in that the resource data is dither-pattern resource data, which is a pattern data for color correction in color processing.

Figure 11:
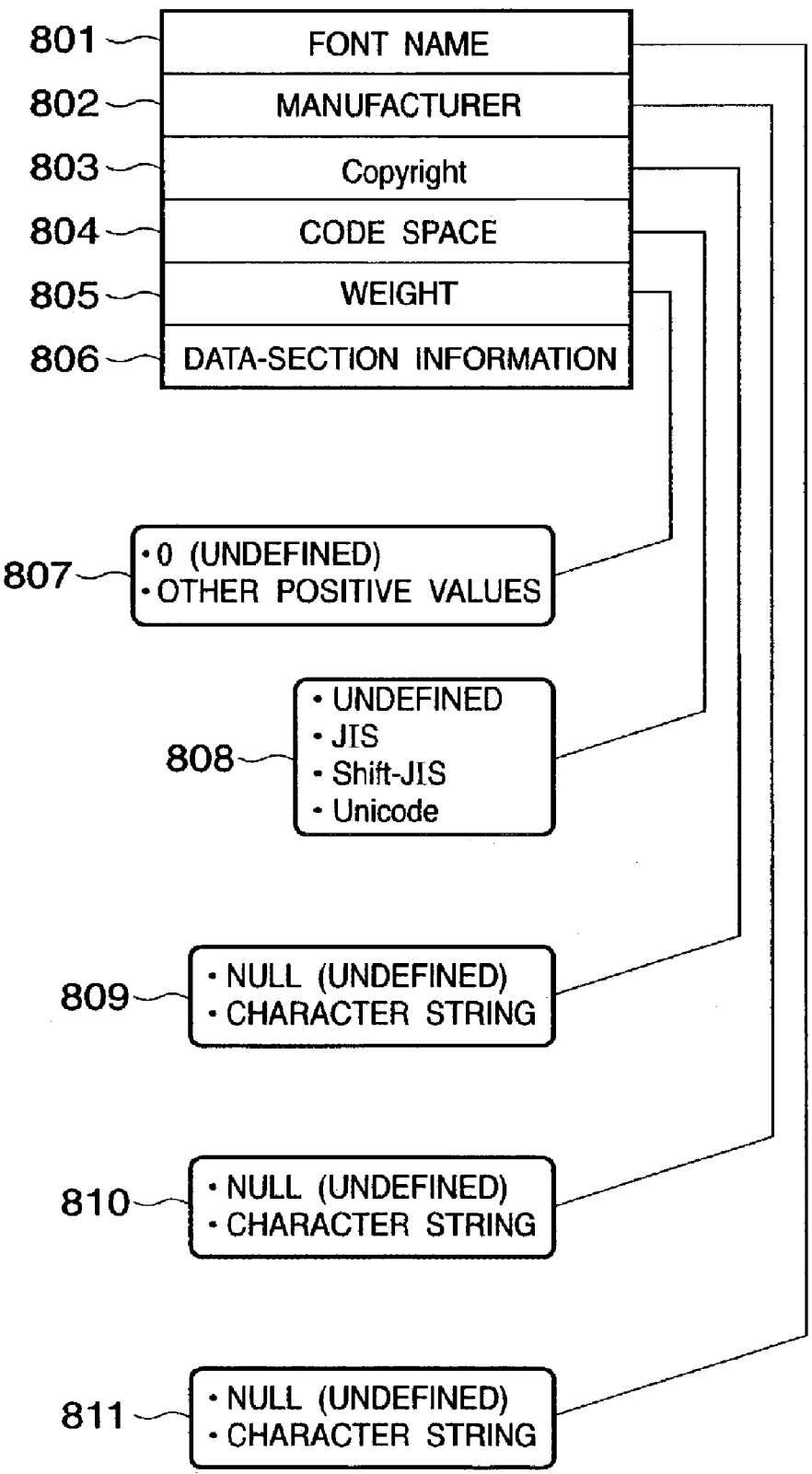
FIG. 11 is a diagram useful in describing the details of attribute data relating to font resource data.

FIG. 11 is a diagram useful in describing the details of attribute data relating to font resource data. As shown in FIG. 11, attribute data 801 regarding font (Font) resource display name agrees with the content of resource data per se of the font resource data within the data processing apparatus. If these items of attribute data do not agree, then operation of the data processing apparatus is not assured. Similarly, the content of resource data per se of the resource data agrees also with regard to attribute data 802 concerning manufacturer, attribute data 803 concerning copyright (Copyright), attribute data 804 concerning code space and attribute data 805 concerning weight.

When a value indicated at numeral 811 has been applied as the attribute data 801 concerning font display name and resource data has been generated in the data processing apparatus, a NULL character string signifying "undefined" is set as the initial value. Further, when a value indicated at numeral 710 has been applied as the attribute data 802 regarding manufacturer and resource data has been generated in the data processing apparatus, a NULL character string signifying "undefined" is set as the initial value. Furthermore, when a value indicated at numeral 809 has been applied as the attribute data 803 concerning copyright and resource data has been generated in the data processing apparatus, a NULL character string signifying "undefined" is set as the initial value.

Furthermore, when a value indicated at numeral 808 has been applied as the attribute data 804 concerning code space and resource data has been generated in the data processing apparatus, "undefined" is set as the initial value. Furthermore, when a value indicated at numeral 807 has been applied as the attribute data 805 concerning weight and resource data has been generated in the data processing apparatus, 0 signifying "undefined" is set as the initial value.

It should be noted that the resource data attributes within the data processing apparatus and the resource data per se are related with regard to data-section information 806. This is information for making it possible to set resource data attributes without the data processing apparatus interpreting the resource data per se. Further, the attribute data and the attribute values thereof within the limits shown in FIG. 10 are not all of the attribute values of the font resource data applied to the present invention.

Further, the type of font capable of being processed by the printing apparatus (image forming apparatus) used in this embodiment is one type only for the sake of simplicity, and fonts have not been classified according to type, e.g., Postscript, TrueType and bitmap, etc. However, in a data processing apparatus that is capable of handling fonts of a plurality of types, a method adopted is to handle fonts as separate resource data on a per-type basis or hold types as attribute data.

More specifically, the present invention is characterized in that the resource data is font resource data used in printing.

Figure 12:
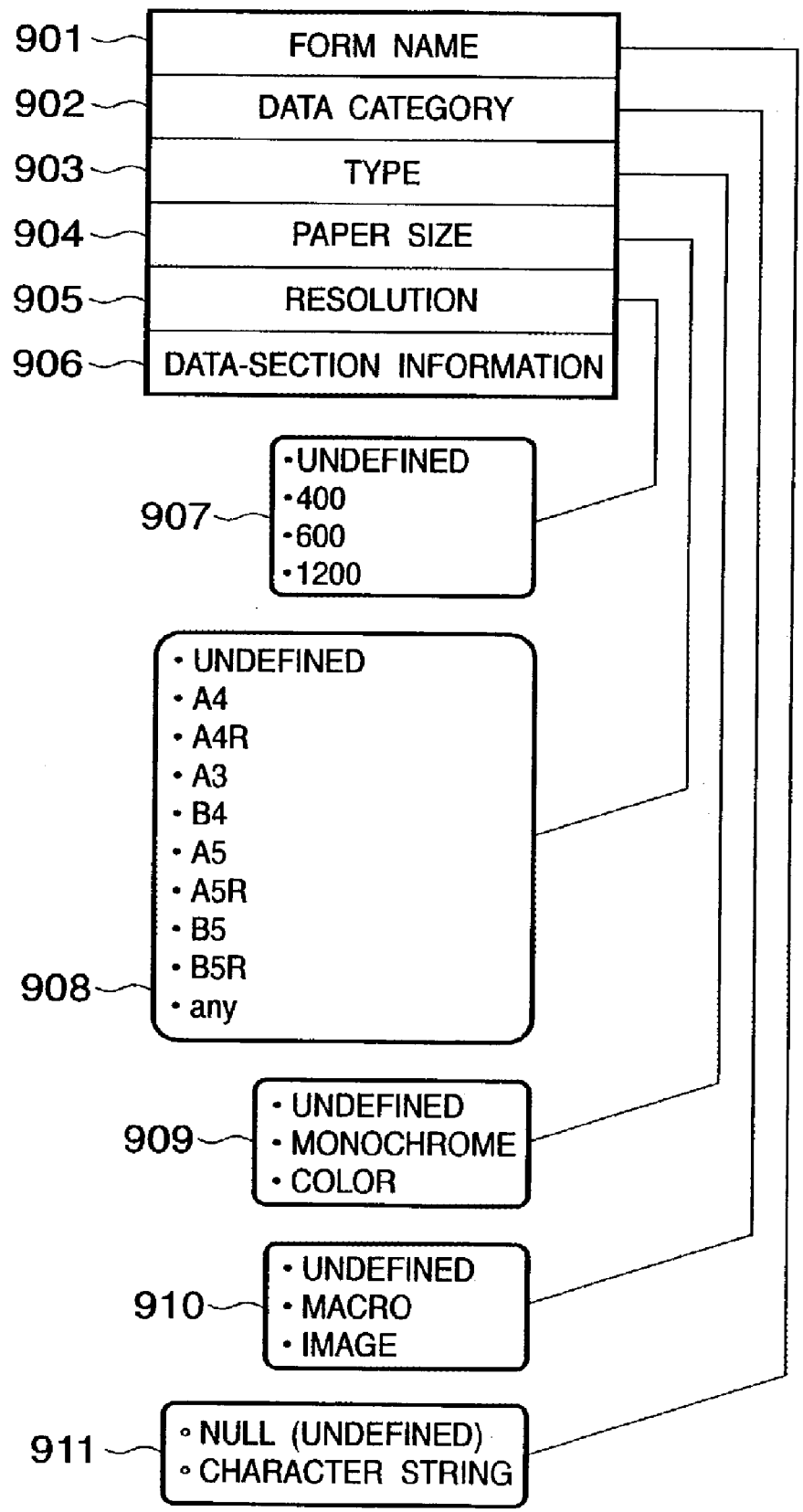
FIG. 12 is a diagram useful in describing the details of attribute data relating to form resource data.

FIG. 12 is a diagram useful in describing the details of attribute data relating to font resource data. As shown in FIG. 12, attribute data 901 regarding form (Font) name is not included in resource data per se of form resource data within the data processing apparatus but is a name assigned by the creator of the form resource data so as to indicate meaning. This name should not be one assigned at will by an individual other than the creator.

The content of resource data per se agrees with regard to attribute data 902 concerning data category, attribute data 903 concerning type, attribute data 904 concerning paper size and attribute data 905 concerning resolution.

When a value indicated at numeral 911 has been applied as the attribute data 901 concerning form name and resource data has been generated in the data processing apparatus, a NULL character string signifying "undefined" is set as the initial value. Further, when a value indicated at numeral 910 has been applied as the attribute data 902 regarding data category and resource data has been generated in the data processing apparatus, "undefined" is set as the initial value.

Furthermore, when a value indicated at numeral 909 has been applied as the attribute data 903 concerning type and resource data has been generated in the data processing apparatus, "undefined" is set as the initial value. Furthermore, when a value indicated at numeral 908 has been applied as the attribute data 904 concerning paper size and resource data has been generated in the data processing apparatus, "undefined" is set as the initial value. Furthermore, when a value indicated at numeral 907 has been applied as the attribute data 905 concerning resolution and resource data has been generated in the data processing apparatus, 0 signifying "undefined" is set as the initial value.

It should be noted that the data-section information 906 is data that relates the resource data attribute and the resource data per se within the data processing apparatus. This is information that makes it possible to set resource data attributes without the data processing apparatus interpreting the resource data per se. Further, the attribute data and the attribute values thereof within the limits shown in FIG. 12 are not all of the attribute values of the form resources handled by the data processing apparatus according to the present invention.

More specifically, the present invention is characterized in that the resource data is form resource data for forming an image by being superimposed on print data at the time of printing.

Figure 13:
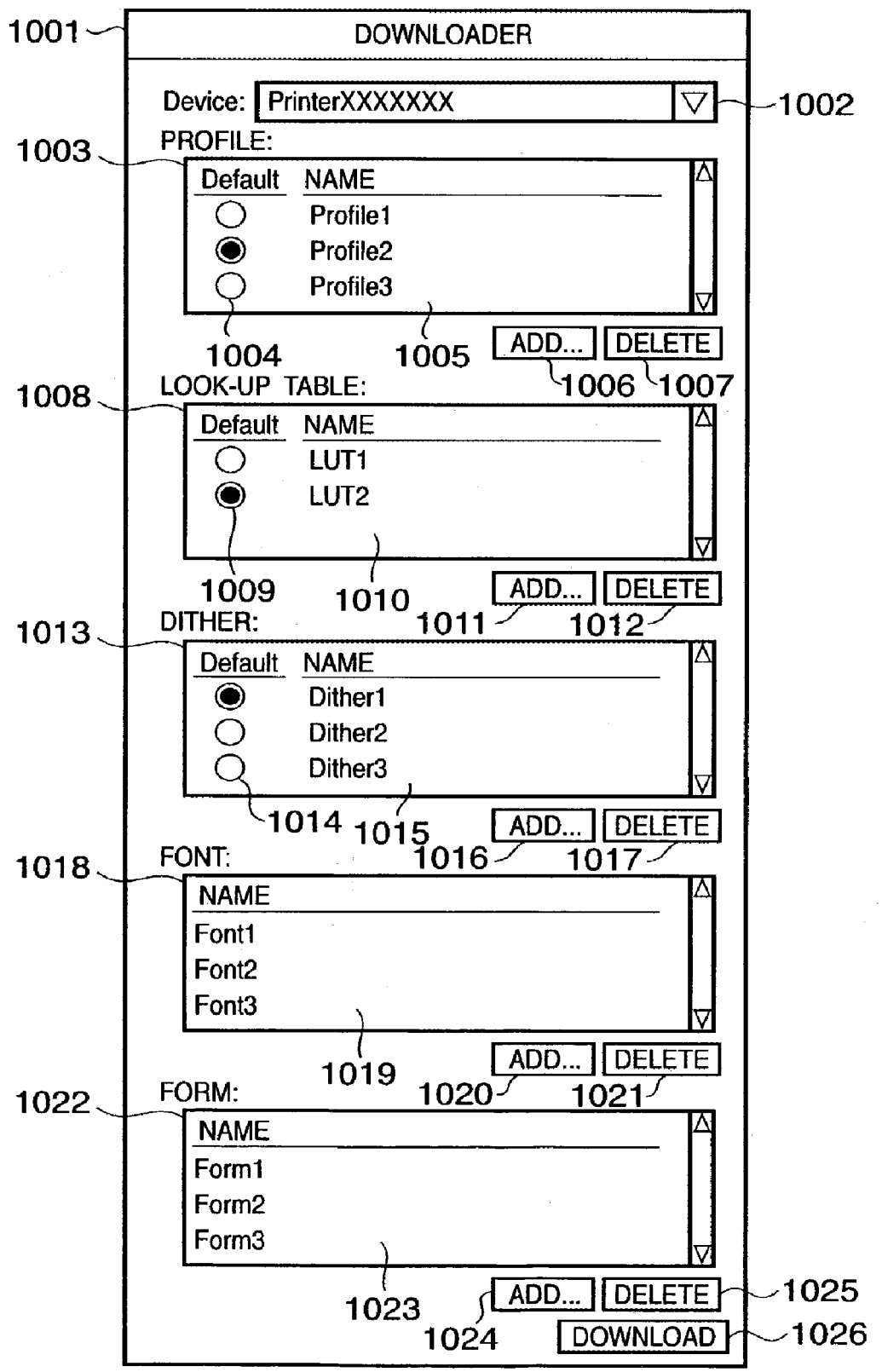
FIG. 13 is an overview useful in describing the control screen of a downloader that operates at the administrator personal computer in the first embodiment.

FIG. 13 is an overview useful in describing the control screen of a downloader that operates at the administrator personal computer 303 in this embodiment.

In FIG. 13, a main window 1001 is activated by the downloader. The main window 1001 is displayed on the display 1709 by starting up the downloader. A user command entered from the input device 1710 is received is reflected in the window.

In this embodiment, it is assumed that the administrator personal computer 303 performs bi-directional communication with the printers 308, 309 or multifunction copiers 306, 307. A device to undergo processing, which device is specified as the download destination indicated at 1002, is displayed in the main window 1001 displayed on the display unit of the administrator personal computer 303.

On the basis of information relating to the device indicated in the device field 1002, resource data that has been stored for the designated device is viewed. As illustrated in FIG. 13, stored information is displayed in the window 1001 in a profile list 1005, look-up table list 1010, dither list 1015, font list 1019 and form list 1023. Concurrently, attribute data of each item of resource data is acquired and, with regard to resource data that has been decided upon as default data, the initial state is reflected by placing a black mark at radio buttons 1004, 1009, 1004 indicating that a particular radio button has been selected.

Reference numeral 1003 denotes a field for setting profile resource data. The user, by clicking an "ADD" button 1006, views profile resource data retained at the administrator personal computer 303 and can make an addition to the list 1005. Further, after selecting any profile in the list 1005 and clicking a "DELETE" button 1007, the user can delete the selected profile resource data from the list 1005. Furthermore, by using the radio buttons 1004, the user can designate any single item in the list 1005 as default resource data.

Numeral 1008 denotes a field for setting look-up table resource data. The user, by clicking an "ADD" button 1011, views look-up table resource data retained at the administrator personal computer 303 and can make an addition to the list 1010. Further, after selecting any look-up table resource data in the list 1010 and clicking a "DELETE" button 1012, the user can delete the selected look-up table resource data from the list 1010. Furthermore, by using the radio buttons 1009, the user can designate any single item of resource data in the list 1010 as default resource data.

Numeral 1013 denotes a field for setting dither-pattern resource data. The user, by clicking an "ADD" button 1016, views dither-pattern resource data retained at the administrator personal computer 303 and can make an addition to the list 1015. Further, after selecting any dither-pattern resource data in the list 1015 and clicking a "DELETE" button 1017, the user can delete the selected dither-pattern resource data from the list 1015. Furthermore, by using the radio buttons 1014, the user can designate any single item in the list 1015 as default resource data.

Numeral 1018 denotes a field for setting font resource data. The user, by clicking an "ADD" button 1020, views font resource data retained at the administrator personal computer 303 and can make an addition to the list 1019. Further, after selecting any font in the list 1019 and clicking a "DELETE" button 1021, the user can delete the selected font data from the list 1019.

Numeral 1022 denotes a field for setting form resource data. The user, by clicking an "ADD" button 1024, views form resource data retained at the administrator personal computer 303 and can make an addition to the list 1023. Further, after selecting any form in the list 1023 and clicking a "DELETE" button 1025, the user can delete the selected form data from the list 1023.

As mentioned above, the user clicks the "ADD" or "DELETE" button in the main window 1001 to add or delete resource data, after which the user clicks a "DOWNLOAD" button 1026

That is, the data processing apparatus according to the present invention is characterized by further having deleting means for deleting detected improper resource data from the image forming apparatus. Further, the data processing apparatus according to the present invention is characterized by further having download means for providing an image forming apparatus with resource data that has been specified by the user.

As a result, download processing is executed in such a manner that the state of the resource data held by a printing apparatus or the like designated at 1002 is made identical with the state being displayed in the main window 1001.

Figure 14:
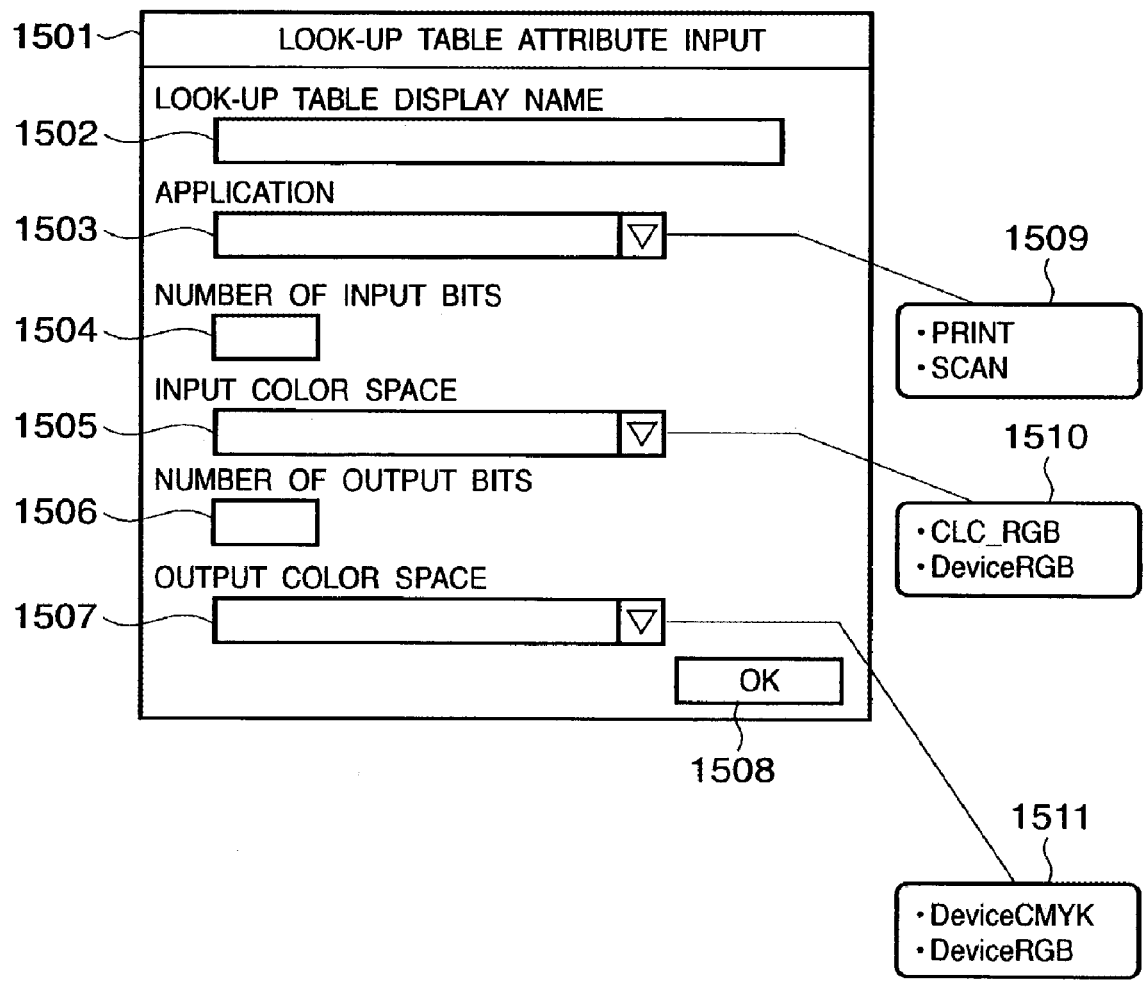
FIG. 14 is an overview of a window serving as one example of an attribute input screen displayed when the name of resource data in lists of a main window is double clicked.

FIG. 14 is an overview of a window 1501 serving as one example of an attribute input screen displayed when the name of resource data in the lists 1005, 1010, 1015, 1023 of a main window is double clicked. In FIG. 14, the window in the case of a look-up table is illustrated as a representative example.

Usually, a downloader sets attributes by utilizing resource data per se as well as a profile information file delivered by the resource creator. The attribute information file is obtained by describing information, which has been extracted from resource data per se, by automatic means using a program or by manual operation with regard to the attributes shown in FIGS. 8 to 12.

However, in a case where a downloader is used by the resource creator per se, or in a case where information from the resource creator is not an electronic file, the screen becomes one provided in order for the user of the downloader to set attributes. The window 1501 accepts items corresponding to attribute data 601 to 606 illustrated in FIG. 9, namely settings of attribute values relating to attribute data that the printing apparatus cannot set on its own accord.

In a case where an entry has not been made in an input area 1502 for entering a look-up table display name, the attribute data 601 is not set and the NULL character string signifying "undefined" remains as is within the data processing apparatus. A value indicated at numeral 1509 is capable of being selected and input in an application input area 1503. In this case also, the attribute data 602 regarding application remains "undefined" if no entry has been made.

A numerical value can be entered in input area 1504 for entering the number of input bits. The attribute data 603 regarding application remains 0, which signifies "undefined", if no entry has been made. A value indicated at numeral 1510 is capable of being selected and input in an input area 1505 for input color space. In this case also, the attribute data 604 regarding input color space remains "undefined" if no entry has been made.

A numerical value can be entered in input area 1506 for entering the number of output bits. The attribute data 605 regarding the output number of bits remains 0, which signifies "undefined", if no entry has been made. A value indicated at numeral 1511 is capable of being selected and input in an input area 1507 for output color space. However, the attribute data 606 regarding output color space remains "undefined" if no entry has been made. By clicking an "OK" button 1508, the setting of attribute data can be completed and the window 1001 can be restored.

Figure 15:
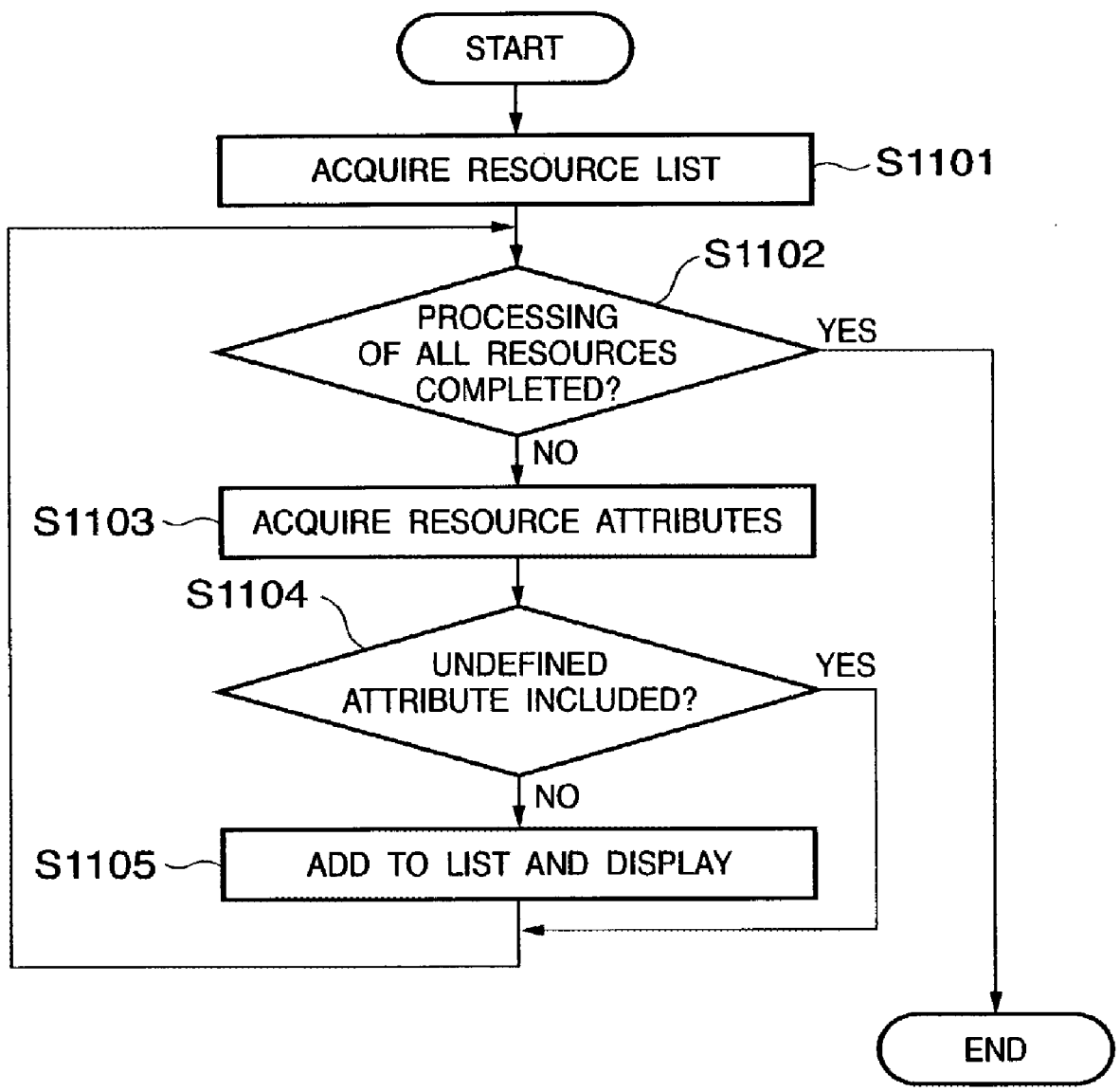
FIG. 15 is a flowchart useful in describing a processing operation that displays a window on a display when a downloader is started up or when a device to undergo processing has been changed in the first embodiment.

FIG. 15 is a flowchart useful in describing a processing operation that displays the window 1001 on the display 1709 when a downloader is started up or when a device 1002 to undergo processing has been changed in this first embodiment. This processing is executed with regard to various resource types relating to profile, look-up table, dither pattern, font and form. In this embodiment, however, processing regarding the data of each resource will be described with reference to a single flowchart.

First, the printing apparatus that has been selected as the device 1002 to undergo processing is accessed and a list of resource data that has been stored in the printing apparatus is acquired (step S1101). Next, it is determined whether processing of all resource data acquired at step S1101 has been completed (step S1102). If it is determined that there is no unprocessed resource data ("YES" at step S1102), processing is terminated. On the other hand, if it is determined that unprocessed resource data remains ("NO" at step S1102), then the unprocessed next item of resource data is adopted as the object of processing and all attribute data of the resource to undergo processing is acquired (step S1103). In other words, in a case where profile resource data has not been processed, the data of each attribute illustrated in FIG. 8 is acquired in its entirety.

In a case where look-up table resource data has not been processed, the data of each attribute illustrated in FIG. 9 is acquired in its entirety. Furthermore, in a case where dither-pattern resource data has not been processed, the data of each attribute illustrated in FIG. 10 is acquired in its entirety. In a case where font resource data has not been processed, the data of each attribute illustrated in FIG. 11 is acquired in its entirety. In a case where form resource data has not been processed, the data of each attribute illustrated in FIG. 12 is acquired in its entirety.

Next, it is determined whether the attribute data acquired at step S1103 includes attribute data signifying "undefined" (step S1104). If it is determined that attribute data signifying "undefined" is included ("YES" at step S1104), control returns to step S1102 and the next item of resource data is adopted as the object of processing. On the other hand, if it is determined that attribute data signifying "undefined" is not included ("NO" at step S1104), then this resource data is added to the list (e.g., list 1005 in the case of profile resource data) and displayed (step S1105). Control then returns to step S1102 and the next resource is adopted as the object of processing.

Thus, it can be so arranged that information relating to resource data (a resource for which a "YES" decision has been rendered at step S1104) detected as improper resource data will not be displayed in the window. That is, the data processing apparatus according to the present invention is characterized in that detecting means detects resource data, for which the value of an attribute has not been set, as improper resource data based upon acquired attribute information relating to resource data.

Figure 16:
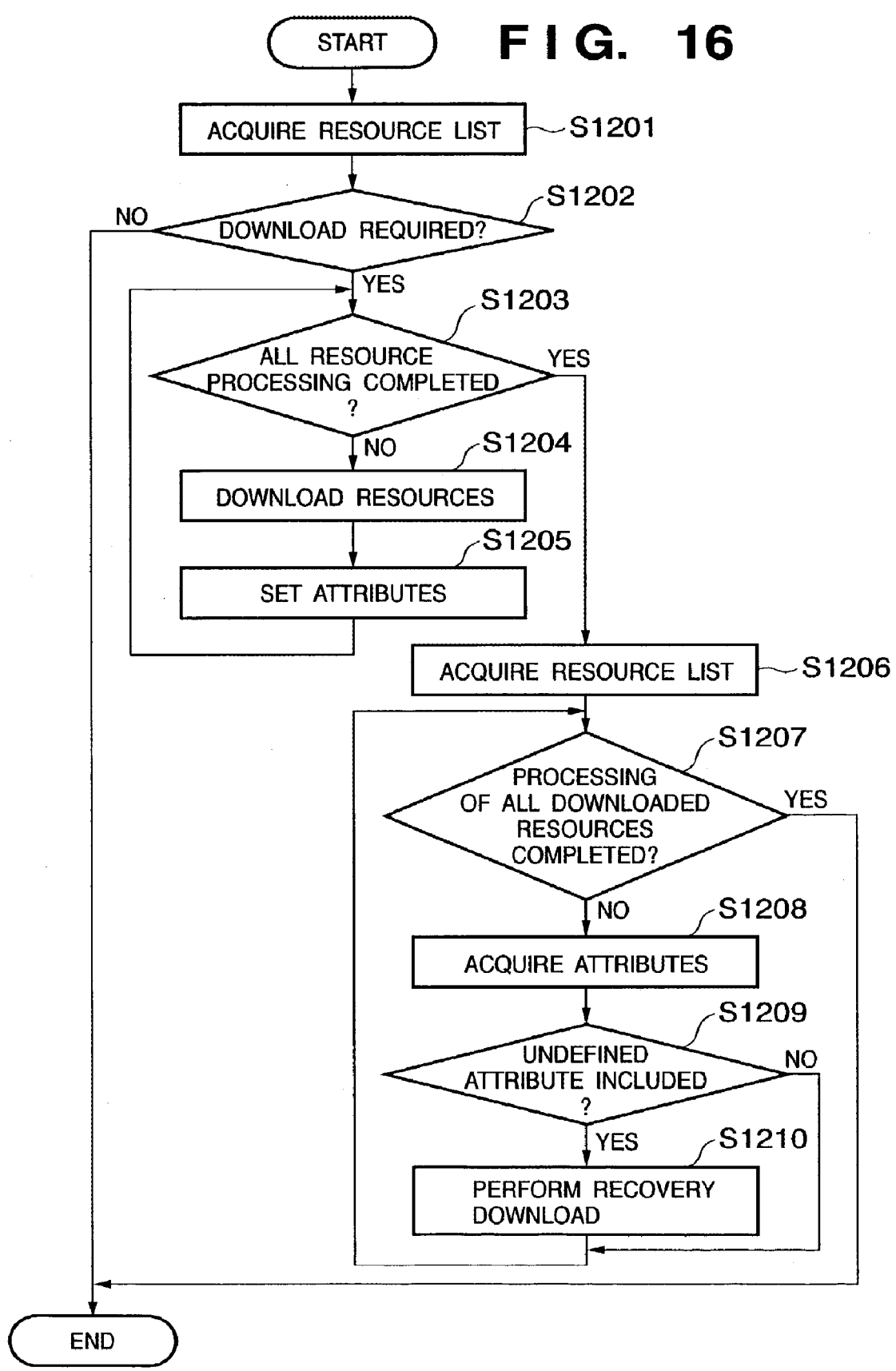
FIG. 16 is a flowchart useful in describing download processing according to the first embodiment, namely a processing operation after a download button is clicked on the screen illustrated in FIG. 13.

FIG. 16 is a flowchart useful in describing download processing according to this embodiment, namely a processing operation executed after the "DOWNLOAD button 1026 is clicked on the screen illustrated in FIG. 13. As set forth above, "DELETE" buttons 1007, 1012, 1017, 1025 appear in the window 1001 illustrated in FIG. 13. In this download processing, resource-data deletion processing in the data processing apparatus is executed in such a manner that the state of resources in the data processing apparatus and the state displayed in the window 1001 will be made to agree. However, since this processing is not central to the present invention, a description thereof in terms of a flowchart is omitted Further, the processing illustrated in this flowchart is executed with regard to various resource types relating to profile, look-up table, dither pattern, font and form. In this embodiment, however, a flowchart illustrated only in regard to one type of resource is used.

First, communication is performed with a printing apparatus designated as the device 1002 to undergo processing and a list of resource data is acquired from this printing apparatus (step S1201).

Next, the state of resource data in window 1001 and the list of resource data acquired at step S1201 are compared, it is determined whether there is resource data to be downloaded, namely resource data included in lists 1005, 1010, 1015, 1019, 1023 but not contained in the list acquired from the printing apparatus, and such data is extracted as data to be downloaded (step S1202).

If it is determined that such resource data exists ("YES" at step S1202), then it is determined whether resource data extracted at step S1202 has been processed in its entirety (step S1203). On the other hand, if it is determined that resource data required download does not exist ("NO" at step S1202), then processing is terminated.

If it is determined that processing regarding all of the resource data has been completed ("YES" at step S1203), then control proceeds to step S1206. On the other hand, if it is determined that processing of all of the resource data has not been completed ("NO" at step S1203), then the next item of resource data is adopted as data to be processed and control proceeds to step S1204.

The resource data is downloaded to a prescribed area in the hard disk 110 within the printing apparatus at step S1204. Setting of attributes of the resource data downloaded at step S1204 is performed at step S1205, the next item of resource data is adopted as data to be processed and control returns to step S1203.

On the other hand, a list of resource data is acquired again at step S1206. This list also includes resource data downloaded at step S1204. It is determined whether the processing regarding all resource data acquired at step S1206 has been completed (step S1207). If it is determined that the processing of all resource data has been completed ("YES" at step S1207), processing is terminated. If it is determined that the processing of all resource data has not been completed ("NO" at step S1207), then the unprocessed next item of resource data is adopted as data to be processed and control proceeds to step S1208.

All attribute data of the resource data to be processed is acquired at step S1208. It is determined whether the attribute data acquired at step S1208 has attribute data for which a value signifying "undefined" has been left set as is (S1209). If it is determined that "undefined" attribute data is not included ("NO" at step S1209), control returns to step S1207 and the next item of resource data is adopted as data to be processed.

On the other hand, if it is determined that "undefined" attribute data is included ("YES" at step S1209), recovery download of resource data to be processed, namely resetting of attributes for which the value signifies "undefined", is executed (step S1210). Control then returns to step S1207, where the next item of resource data is adopted as data to be processed. It should be noted that this flowchart assumes a case where an attribute setting cannot be made correctly owing to a communication error or the like, and it is so arranged that the processing of step S1210 is executed automatically.

More specifically, the data processing apparatus according to the present invention further comprises download means for providing an image forming apparatus with resource data. The information acquisition means reacquires attribute information relating to resource data, which has been stored in the image forming apparatus, after the image forming apparatus is provided with the resource data. The detecting means redetects improper resource data based upon the acquired attribute information relating to the acquired resource data after the image forming apparatus is provided with the resource data. In response to improper resource data that has been detected, providing means re-provides attribute information relating to the improper resource data after the image forming apparatus is provided with the resource data.

Further, the data processing apparatus according to the present invention is characterized in that the providing means provides the attribute information for the purpose of setting attribute information relating to resource data. Furthermore, the data processing apparatus according to the present invention is characterized in that the providing means re-provides the attribute information relating to the improper resource data for the purpose of setting a value of an undefined attribute in response to improper resource data that has been detected.

That is, the data processing apparatus according to the present invention is characterized by further comprising re-acquisition means for reacquiring information relating to resource data within the image forming apparatus after prescribed processing (downloading and setting of attributes) regarding resource data is executed.

Another method according to the present invention is to assume that the operator of the downloader has forgotten to make an input, display an attribute setting screen of the kind shown in FIG. 14, request the user to enter an attribute value and then perform attribute recovery downloading (setting of attributes) at step S1210. A further method is to assume that there is inadequate information from the resource creator, report the fact that attribute data signifying "undefined" is present and request the operator of the downloader to render a decision.

Thus, as described above, it is possible to detect improper resource data, namely resource data having attribute data signifying "undefined", in a printing apparatus. Further, it is possible to so arrange it that resource data to be downloaded will not be improper resource data.

Second Embodiment

In a second embodiment of the invention, a case will be described in which resource data held in the form shown in FIG. 6 is downloaded to the printers 308, 309 or multifunction copiers 306, 307 by a downloader in the administrator personal computer 303 in the environment illustrated in FIG. 3. It will be assumed that the attribute data described in FIG. 8 is held in case of profile resource data, the attribute data described in FIG. 9 in case of look-up resource data, the attribute data describing in FIG. 10 in case of dither-pattern resource data, the attribute data described in FIG. 8 if the resource is a font resource, and the attribute data described in FIG. 9 if the resource is a form resource.

Figure 17:
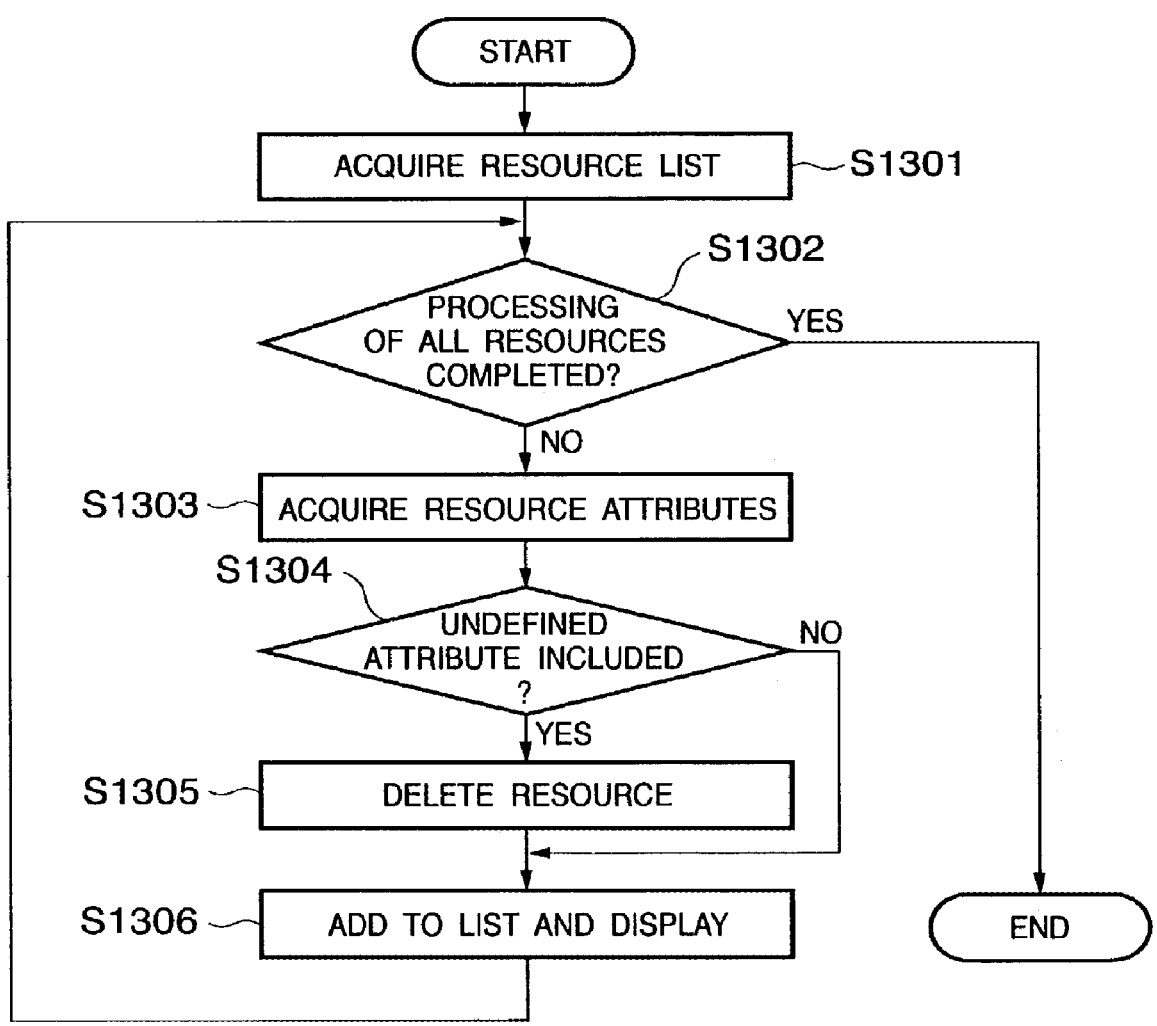
FIG. 17 is a flowchart useful in describing a processing operation that displays a window on a display when a downloader is started up or when a device to undergo processing has been changed in a second embodiment.

FIG. 17 is a flowchart useful in describing a processing operation that displays the window 1001 on the display 1709 when a downloader is started up or when a device 1002 to undergo processing has been changed in this first embodiment. This processing is executed with regard to various resource data, namely profile, look-up table, dither pattern, font and form. In this embodiment, the above processing will be described using a flowchart relating to one type of resource data.

First, the printing apparatus that has been selected as the device 1002 to undergo processing is accessed and a list of resource data that has been stored in the printing apparatus is acquired (step S13101). Next, it is determined whether processing of all resource data acquired at step S1301 has been completed (step S1302). If it is determined that resource data requiring processing remains ("NO" at step S1302), then the unprocessed next item of resource data is adopted as the object of processing and all attribute data of the resource data to undergo processing is acquired (step S1303).

In other words, in the case of profile resource data, each attribute illustrated in FIG. 8 is acquired in its entirety. Further, in the case of look-up table resource data, each attribute illustrated in FIG. 9 is acquired in its entirety; in the case of dither-pattern resource data, each attribute illustrated in FIG. 10 is acquired in its entirety; in the case of font resource data, each attribute illustrated in FIG. 11 is acquired in its entirety; and in the case of form resource data, each attribute illustrated in FIG. 12 is acquired in its entirety.

Next, it is determined whether the attribute data acquired at step S1303 includes attribute data signifying "undefined" (step S1304). If it is determined that attribute data signifying "undefined" is not included ("NO" at step S1304), then control proceeds to step S1306. If it is determined that attribute data signifying "undefined" is included ("YES" at step S1304), then this resource data is deleted from the data processing apparatus (step S1305). This resource data is then added to the list (e.g., list 1005 in the case of profile resource data) and displayed (step S1306). Control then returns to step S1302 and the next resource is adopted as the object of processing.

On the other hand, if it is determined that resource data requiring processing does not remain ("YES" at step S1302), then processing is terminated. It should be noted that the purpose of including the resource data deleted at step S1305 in the list is to effect recovery in the current execution of download processing assuming that incomplete resource data has been left in the data processing apparatus owing to suspension in mid-course owing communication error downloaded earlier.

In this embodiment, resource data is simply added to a list. However, another method is to change the list display format to other resource data and make the user aware of the fact that the data is improper resource data. A further method is to query the user as to whether to download improper resource data again and add the data to the list only if such re-downloading is performed.

Figure 18:
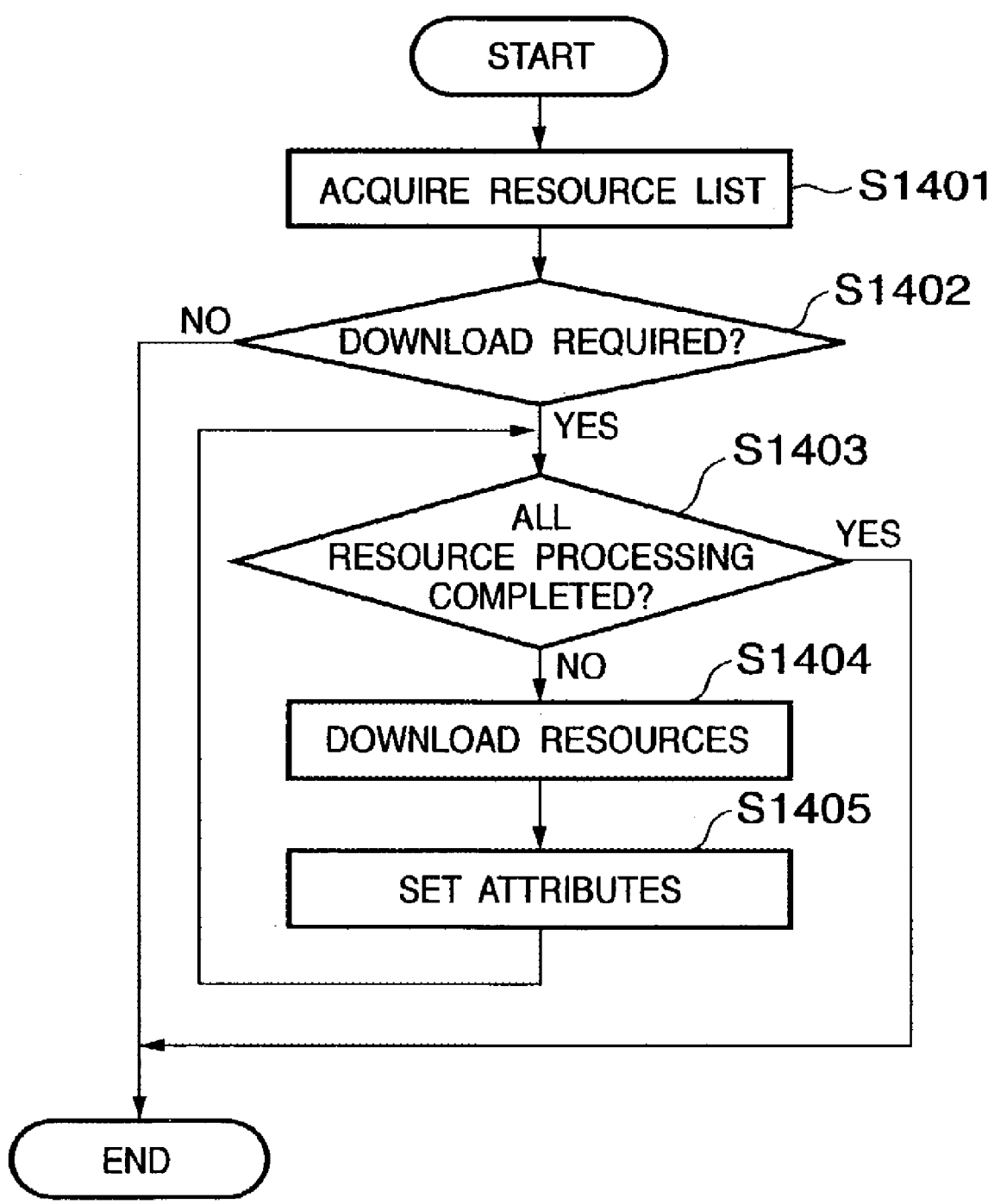
FIG. 18 is a flowchart useful in describing download processing according to this embodiment, namely a processing operation after the download button is clicked on the screen illustrated in FIG. 13.

FIG. 18 is a flowchart useful in describing download processing according to this embodiment, namely a processing operation executed after the "DOWNLOAD" button 1026 is clicked on the screen illustrated in FIG. 13.

As described above, "DELETE" buttons 1007, 1012, 1017, 1025 appear in the window 1001 shown in FIG. 13. In download processing, resource-data deletion processing in the data processing apparatus is executed in such a manner that the state of resources in the data processing apparatus and the state displayed in the window 1001 will be made to agree. However, since this processing is not central to the present invention, a description thereof in terms of a flowchart is omitted.

Further, this processing is executed in relation to each of resource types, namely profile, look-up table, dither pattern, font and form. For the sake of explanation, however, a flowchart relating to one type of resource is illustrated.

First, communication is performed with a printing apparatus designated as the device 1002 to undergo processing and a list of resource data is acquired from a prescribed area within this printing apparatus (step S1401). Next, the state of resource data in window 1001 and the list of resource data acquired at step S1401 are compared, it is determined whether there is resource data to be downloaded, namely resource data included in lists 1005, 1010, 1015, 1019, 1023 but not contained in the list of resource data acquired from the printing apparatus, and such data is extracted as data to be downloaded (step S1402).

If it is determined that such resource data exists ("YES" at step S1402), then control proceeds to step S1403. Here it is determined whether resource data extracted at step S1402 has been processed in its entirety. If it is determined that all of the resource data extracted at step S1402 has been completed ("YES" at step S1403), then processing is terminated. On the other hand, if it is determined that processing of all of the resource data has not been completed ("NO" at step S1403), then the next item of resource data is adopted as data to be processed and control proceeds to step S1404.

The resource data is downloaded to a prescribed area in the hard disk 110 within the printing apparatus at step S1404. Setting of attributes of the resource data downloaded at step S1404 is performed at step S1405 and the next item of resource data is adopted as data to be processed. On the other hand, if it is determined that resource data to be downloaded does not exist ("NO" at step S1402), then processing is terminated.

Thus, as described above, it is so arranged that when downloading starts, improper resource data within a printing apparatus, namely resource data having attribute data signifying "undefined", is not left within the printing apparatus, and the state of the resource data within the printing apparatus can be returned to normal. Furthermore, improper resource data left within the printing apparatus in a case where downloading is suspended in mid-course owing to communication error or the like can be revised by subsequent processing performed by a downloader.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiments to a system or an apparatus, reading the program codes with a computer (or CPU or MPU) of the system or apparatus from the recording medium, and then executing the program codes. In this case, the program codes read from the recording medium implement the novel functions of the embodiments, and the recording medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to 2the embodiment.

It goes without saying that the present invention further covers a case where, after the program codes read from the recording medium are written in a function expansion card inserted into the computer or in a memory provided in a function expansion unit connected to the computer, a CPU or the like contained in the function expansion card or function expansion unit performs a part of or the entire process in accordance with the designation of program codes and implements the functions of the above embodiment.

In a case where the present invention is applied to the recording medium, program code corresponding to the flowcharts described earlier would be stored on the recording medium.

Thus, in accordance with the present invention, as described above, improper resource data that has been stored in a printing apparatus can be detected. Further, according to the present invention, improper resource data within a printing apparatus can be detected automatically and restored, and a downloader can execute reliable download processing.

Furthermore, the above effects can be obtained by applying the present invention to font resource data, form resource data, profile resource data, look-up resource data and dither-pattern resource data.

The present invention is not limited to the above embodiments and various changes can be made within the spirit and scope of the present invention. Therefore, to apprise the public of the scope of the present invention, the following claims are made.

The invention claimed is:

1. An information processing apparatus for transmitting a resource, which is used in printing in an image forming apparatus and includes an attribute capable of setting a setting value, to the image forming apparatus, the information processing apparatus comprising:
   a first determining unit configured to determine a first resource that includes an attribute for which the setting value has not been set;
   a second determining unit configured to determine whether or not a second resource, which is not determined by the first determining unit as including the attribute for which the setting value has not been set, is stored in the image forming apparatus; and
   a transmitting unit configured to transmit, if the second determining unit determines that the second resource is not stored in the image forming apparatus, the second resource to the image forming apparatus,
   wherein the first resource determined by the first determining unit as including the attribute for which the setting value has not been set is not transmitted to the image forming apparatus.

2. The information processing apparatus according to claim 1, further comprising a display unit configured to not display the first resource determined by the first determining unit as including the attribute for which the setting value has not been set on a display window of the information processing apparatus, and display the second resource not determined by the first determining unit as including the attribute for which the setting value has not been set on the display window of the information processing apparatus,
   wherein the transmitting unit execute a transmitting process after a transmitting instruction.

3. An information processing method for transmitting a resource, which is used in printing in an image forming apparatus and includes an attribute capable of setting a setting value, to the image forming apparatus, the information processing method comprising:
   determining a first resource that includes an attribute for which the setting value has not been set;
   determining whether or not a second resource, which is not determined by the first determining unit as including the attribute for which the setting value has not been set, is stored in the image forming apparatus; and
   transmitting, if it is determined that the second resource is not stored in the image forming apparatus, the second resource to the image forming apparatus.

4. The information processing method according to claim 3, further comprising not displaying the first resource, determined by the determining as including the attribute for which the setting value has not been set on a display window, and displaying the second resource, not determined by the determining as including the attribute for which the setting value has not been set on the display window, wherein the transmitting executes a transmitting process after a transmitting instruction.

5. An article of manufacture for controlling an information processing apparatus for transmitting a resource, which is used in printing in an image forming apparatus and includes an attribute capable of setting a setting value, to the image forming apparatus, comprising a non-transitory computer readable medium containing program code that when executed by a computer causes the information processing apparatus to perform:
   determining a first resource that includes an attribute for which the setting value has not been set;
   determining whether or not a second resource, which is not determined by the first determining unit as including the attribute for which the setting value has not been set, is stored in the image forming apparatus; and
   transmitting, if it is determined that the second resource is not stored in the image forming apparatus, the second resource to the image forming apparatus.

* * * * *